United States Patent
Warburton et al.

(10) Patent No.: US 10,817,588 B2
(45) Date of Patent: Oct. 27, 2020

(54) RATIO-REFERENCE MEASUREMENT OF THE ARRIVAL TIME AND/OR AMPLITUDE OF A DIGITIZED ELECTRONIC PULSE

(71) Applicant: XIA LLC, Hayward, CA (US)

(72) Inventors: William K. Warburton, Oakland, CA (US); Wolfgang G. Hennig, Fremont, CA (US)

(73) Assignee: XIA LLC, Hayward, CA (US)

( * ) Notice: Subject to any disclaimer, the term of this patent is extended or adjusted under 35 U.S.C. 154(b) by 211 days.

(21) Appl. No.: 15/431,524

(22) Filed: Feb. 13, 2017

(65) Prior Publication Data

US 2018/0113160 A1    Apr. 26, 2018

Related U.S. Application Data

(60) Provisional application No. 62/495,613, filed on Oct. 24, 2016.

(51) Int. Cl.
*G06F 17/17* (2006.01)
*G01S 7/4865* (2020.01)
(Continued)

(52) U.S. Cl.
CPC .......... *G06F 17/17* (2013.01); *G01S 7/4865* (2013.01); *G01S 7/4866* (2013.01); *G01S 7/497* (2013.01); *G01S 17/10* (2013.01)

(58) Field of Classification Search
None
See application file for complete search history.

(56) References Cited

U.S. PATENT DOCUMENTS

2007/0036241 A1* 2/2007 Sahinoglu ............. G01S 5/0221
375/317
2009/0224158 A1 9/2009 Haselman et al.
(Continued)

FOREIGN PATENT DOCUMENTS

WO    2016082006 A1    6/2016

OTHER PUBLICATIONS

Ho, K.C., Chan, Y.T., Inkol, R.J.; Pulse arrival time estimation based on pulse sample ratios; Aug. 1995; IEE Proc.-Radar, Sonar Navig., vol. 142, No. 4; pp. 153-157 (Year: 1995).*

(Continued)

*Primary Examiner* — Gregory J Toatley, Jr.
*Assistant Examiner* — Terence E Stifter, Jr.
(74) *Attorney, Agent, or Firm* — Kilpatrick Townsend & Stockton LLP

(57) ABSTRACT

A digital processing technique for measuring a characteristic of a digitized electronic signal pulse, particularly including its time of arrival and/or maximum. The technique is particularly suited for in-line implementation in a field programmable gate array or digital signal processor. For each detected pulse, one or more ratios are created from values of the pulse above baseline, obtained from regions of the pulse where the values change as its arrival time offset changes, and the ratio or ratios are used as variables in a reference table or equation to generate the value of the desired characteristic. The table or equation is created beforehand by using a secondary technique to study pulses of the type being measured, to establish the relationship between the ratio value or values and the desired characteristic, and to codify that relationship in the reference table or equation. Time resolutions of 2-3% of the sampling interval are demonstrated.

30 Claims, 10 Drawing Sheets

(51) Int. Cl.
*G01S 17/10* (2020.01)
*G01S 7/497* (2006.01)

(56) References Cited

U.S. PATENT DOCUMENTS

| | | |
|---|---|---|
| 2011/0251828 A1 | 10/2011 | Scoullar et al. |
| 2012/0063547 A1* | 3/2012 | Pietrzyk .................. G01S 11/02 375/316 |
| 2013/0143595 A1 | 6/2013 | Moshfeghi |
| 2014/0107975 A1* | 4/2014 | Manton .................... G01D 3/10 702/179 |
| 2014/0204700 A1* | 7/2014 | Valero ................... G01S 15/006 367/7 |

OTHER PUBLICATIONS

PCT/US2017/058143, "International Search Report and Written Opinion", dated Dec. 27, 2017, 12 pages.
Asztalos et al., "General Purpose Pulse Shape Analysis for Fast Scintillators Implemented in Digital Readout Electronics", Nuclear Instruments & Methods in Physics Research Section A, vol. 806, Sep. 7, 2015, pp. 132-138.
European Patent Application No. 17864660.0, Extended European Search Report dated May 12, 2020, 7 pages.

\* cited by examiner

RATIO-REFERENCE MEASUREMENT OF THE ARRIVAL TIME AND/OR AMPLITUDE OF A DIGITIZED ELECTRONIC PULSE

CROSS REFERENCE TO RELATED APPLICATIONS

This application claims the benefit of U.S. Provisional Patent Application No. 62/495,613, filed Oct. 24, 2016, for "Ratio-Reference Measurement of the Arrival Time and/or Amplitude of a Digitized Electronic Pulse" (inventors William K. Warburton and Wolfgang G. Hennig), the entire disclosure of which is hereby incorporated by reference for all purposes. Application No. 62/495,613 was originally filed as a non-provisional application, namely U.S. patent application Ser. No. 15/332,836, and subsequently converted to a provisional application.

This application is related to U.S. patent application Ser. No. 15/332,941, filed Oct. 24, 2016, for "Interpolation Measurement of the Arrival Time and/or Amplitude of a Digitized Electronic Pulse" (inventor William K. Warburton), the entire disclosure of which is hereby incorporated by reference for all purposes.

TABLE OF CONTENTS

Cross Reference to Related Applications
Background of the Invention
1.
   1.1. Current analog art for detecting pulse arrival times
   1.2. Digital detection of pulse arrival times
   1.3. Current digital art for detecting pulse arrival times
   1.4. The need for improved digital timing algorithms
   1.5. Pulse amplitude measurements
Summary of the Invention
Brief Description of the Drawings
Description of Specific Embodiments
2.
   2.1. Hardware Considerations
   2.2. Development of the method
   2.3. An arrival time implementation using peak ADC samples from very fast pulses
   2.4. Choice of reference data sample
   2.5. An arrival time implementation using leading edge ADC samples
   2.6. Modified methods for measuring time of arrival
   2.7. An amplitude implementation using peak ADC samples
   2.8. An amplitude implementation using leading edge ADC samples
   2.9. Gate array implementation
   2.10. Extensions to other pulse characteristics
3. References
4. Conclusions
What is Claimed is:
Abstract of the Disclosure

BACKGROUND OF THE INVENTION

The present invention relates generally to the detection of the time of arrival of signal pulses and measuring their amplitudes. This problem arises in many fields and contexts. For timing, a small set of examples include: medicine, where coincidence between photons is the core component of PET scanning; nuclear physics, where time of arrival is used to determine neutron energies; and LIDAR, where range to target is found from total photon travel time. This list is far from complete and is presented merely to suggest the breadth of applications. We note that, commonly, timing measurements fall into two classes.

In the first class, the time of arrival is compared to some "start" signal and the measured interval carries the information of interest (e.g., LIDAR, where "start" is the emission of the laser pulse and the time interval represents the distance to the target). An important subclass is time-of-flight (TOF), where the interval measures the time for a particle to traverse a known distance. This is the way neutron energies are measured, with the start coming from a nuclear decay and the stop from a proton ejected in a scintillator by the neutron. Dividing the trajectory distance by the TOF gives the neutron's velocity and hence its energy. The amplitude of the proton-generated pulse carries no information about the neutron's energy and is not of interest.

In the second class, time differences between multiple events are measured and compared and only those pairs that occur within a preset time difference (the "coincidence window") represent valid events for analysis (e.g., PET, where pairs of gamma-rays emitted from the same positron decay are found thusly). For amplitude measurement, a common example is the determination of energies of x-rays and gamma-rays absorbed in a variety of detectors, where accuracies of 0.1 to 1-2 percent may be required, depending upon the application. Here the time of arrival is not of interest. We therefore see that, depending upon the application, the time-of-arrival, the amplitude, or both may be of interest. Further, while this invention was developed in the context of the detection of photons in photomultiplier tubes, its range of application will be much broader.

1

1.1. Current Analog Art for Detecting Pulse Arrival Times

FIG. 1 represents a typical pulse 10 whose arrival time we might want to detect. For the purposes of illustration it has a full width at half maximum of about 20 ns and is shown as it would appear if digitized at 2 GSA (gigasamples/second), which closely tracks the underlying analog signal. As is common, its risetime is faster than its fall time, the former typically set by the bandwidth of the circuit and the latter by some physical process such as the decay time of a scintillator.

Knoll [KNOLL—2000] lists various techniques used in nuclear physics for the detection of pulses and a review of related fields shows that these are typical of other areas as well, the problem not being specific to any particular application. These methods, all initially developed for use in analog electronics, include: 1: leading edge triggering; 2: crossover timing; 3: constant fraction discrimination; 4: amplitude and risetime compensated timing; and 5: extrapolated leading edge timing. We briefly elaborate these in the following.

Leading edge timing is very simple. The input signal is compared to a fixed threshold by a fast comparator, which produces an output signal when an incoming pulse crossed the threshold. This method works best for pulses of a similar shape and amplitude since larger pulses will cross the threshold earlier than smaller pulses.

Crossover timing. In this method, the input signal is differentiated and the peak of the original pulse is detected as time of arrival by the zero crossing of the differentiated signal. For this to work the pulse shape must not vary. Further, as it is generally understood that time resolution improves with the slope of the signal (large derivative) this method is limited by looking for a zero value in the derivative.

Constant fraction timing. In analog implementations, this is carried out by adding together the original signal attenuated by a factor f and the original signal delayed and inverted, as shown by the trace a-CFD 12 in FIG. 1. The zero crossing is taken as the time of arrival $t_A$ 14. This works best for signals whose time at or close to maximum is large compared to their rise times and also have a constant pulse shape.

Amplitude and risetime compensated timing is a variant of constant fraction timing intended for use with pulses whose shapes are not constant, as typically found in large germanium detectors where an absorbed gamma-ray may deposit charge at multiple locations. The method sets f small so that the crossover point occurs close to the arrival of the pulse, before it has much chance to change shape.

Extrapolated leading edge timing uses two leading edge discriminators set at different voltages ($v_1$ and $v_2$), captures their crossing times ($t_1$ and $t_2$) and uses the resultant pair of points ($v_1$, $t_1$) and ($v_2$, $t_2$) to extrapolate back to an inferred arrival time (0, $t_0$). This method assumes that pulse shapes are initially constant. A weakness is that the detected points are found at low signal slopes, which inherently reduces timing accuracy, and that a difference is required, which also adds further errors.

1.2. Digital Detection of Pulse Arrival Times

The arrival of digital signal processing brought both opportunities and challenges to the problem of detecting pulse arrival times. On the one hand, many techniques that are difficult in analog electronics, in particular linear time delays, are trivial digitally using shift registers. On the other hand, digital samples of the signal are only available at intervals, with the intervening signal being lost.

In any case, the first response to the advent of digital sampling and processing was to simply implement the well understood analog timing methods digitally. Thus Haw [HAW—1973] presents what is essentially constant fraction discrimination. Kelly [KELLY—1993] describes extrapolated leading edge timing. Burns and Tso [BURNS—1995] describe a hybrid method that is essentially analog constant fraction discrimination but with the pulse delay being carried out digitally. Vernon [VERNON—2008] digitally implements extrapolated leading edge timing by fitting a straight line to a series of points on the pulse's leading edge and extrapolating back to the baseline to find the arrival time.

In most cases, the resultant time resolutions were degraded, compared to what could be achieved using analog methods. To understand this, we look at FIG. 2, which compares the method implemented with samples taken at 2 GSA 12 to the same method using samples taken at 100 MS/s (megasamples/sec) 16. In both cases the same CFD function is implemented:

$$CFD[i]=fy[i]-y[i-D], \qquad (1)$$

where f is the weighting fraction and D is the number of points required to implement the desired delay. Clearly, since the 2 GSA trace 12 has 20 times as many points (0.5 ns/point) as the 100 MS/s trace 22 (10 ns/point), D will be 20 times larger in the former case to implement the same delay. The zero crossing is then estimated by extrapolating between the two data points bracketing zero. This linear extrapolation line 24 is shown for the 100 MS/s case.

An enlarged view of the extrapolation view is shown in FIG. 3, including the bracketing points A 36 and B 38. The 100 MS/s zero crossing, found from the intersection between the linear extrapolation 24 and zero is $t_D$ 30. The linear extrapolating line for the 2 GSA zero crossing, $t_A$ 32 is not shown. The two estimates differ by about 0.5 ns and clearly arise from the local curvature of the CFD signal, which the 2 GSA signal tracks closely. The magnitude of the error clearly increases as the bracketing points lie further from the zero crossing point.

While the arrival time error can be minimized by digitizing pulses at extremely high rates, there are associated costs which include not just the higher cost of high speed analog to digital converters (ADCs) but also the associated power consumption and parts costs of providing the downstream digital processing electronics that can operate at the same rate. Where more accurate timing is required from slower ADCs, methods have been developed to interpolate the d-CFD function 22 between the bracketing points A 36 and B 38 using a variety of methods that include fitting a polynomial or spline to the pulse locally or fitting some more general curve to the entire pulse. We will review some of these methods in the next section. Their general result is to produce values of the pulse at much closer intervals 40, which can then be interpolated, just as if the pulse had been locally sampled by a much faster digitizer.

1.3. Current Digital Art for Detecting Pulse Arrival Times

In this section we will review the current literature that provides the present level of performance for digitally implemented timing systems as these results will create the standard by which to judge the performance of the present invention. Generally speaking, we will look at two classes of timing experiment: 1) those using very fast pulses, for example from a fast semiconductor detector, such as a silicon PMT (SiPM) or avalanche detector, or from a PMT with a picosecond laser pulse input. These pulses typically have a risetime as short as 1-2 ns and a fall time of 2-5 ns. 2) Those using pulses from fast inorganic scintillators coupled to PMTs. A typical example is $LaBr_3$, which a risetime of 3-4 ns and a fall time of 25-30 ns.

Bardelli et al. [BARDELLI—2004] studied the factors affecting time resolution for digitized charge integrating preamplifier pulses (step pulses with a fast leading edge) including sampling rate and number of digitizer bits. Observing errors due to simple linear interpolation between the digital samples, as described in reference to FIG. 3 above, they investigate various polynomial interpolation methods and develop curves of expected error as a function of preamplifier rise time for different sampling rates and effective number of digitizer bits. Working with a Si detector, they claim to have achieved 125 ps time resolution, but the meaning of this result is unclear, since it is between two different implementations of digital timing for the same pulse, taken on a pulse by pulse basis, which means that the errors in the two measurements may not be independent.

Ronzhin et al. [RONZHIN—2010] used analog electronics with silicon photomultipliers (SiPMs) pulsed with a picosecond laser to investigate time resolution as a function of SiPM size and overvoltage. Their best results were of order 100 ps using 405 ns laser light, which sets a standard for these devices. These times are similar (123 ps) reported by Buzhan et al. [BUZHAN—2003], who did not provide a detailed description of their experimental setup. On the digital side, Tiege et al. [TIEGE—2005] sampled pulses at 2.5 GSA from FEU-84-3 PMTs illuminated with a LN300C nitrogen laser, applied a Gaussian to linear transformation followed by a linear interpolation at 50% of peak to obtain 150-180 ps time resolution. About 10 years later, Wang et al. [WANG—2016] looked at cosmic ray pulses in EJ200 fast plastic scintillators using 900 ps risetime GDB60 PMTs digitized with a well calibrated DRS4 digitizer at 5 GSA and obtained 113-132 ps time resolution FWHM.

Looking at organic scintillators, in 2005 Moszynski et al. [MOSZYNSKI—2005] used analog electronics with a XP20D0 PMT to measure achievable time resolutions with several organic scintillators. In particular, using LaBr$_3$, they achieved 200 ps for 511 keV gamma-rays and 140 ps with 1.33 MeV gamma-rays, the larger pulses reducing errors due to both noise and digitization errors from ADC non-linearity and effective number of bits. On the digital side, Fallu-Labruyere et al. [FALLU-LABRUYERE—2007] implemented a zero crossing CFD digitally using a 75 MS/s 12 bit ADC and obtained 576 ps FWHM from LaBr3. This was better than the results obtained by Haselman et al. [HASELMAN—1997, 2011], who estimated pulse heights from pulse areas and then created a lookup table for pulse arrival time based on the pulse height and the amplitude of the first sample on the curve above some threshold, but were only able to achieve 2.4 ns FWHM using a 70 MS/s ADC and LSO, which also has a fast risetime. Some years later, in 2013, Mutti et al. [MUTTI—2013] did somewhat better looking for zero crossings in the pulses' second derivatives (i.e., crossover timing), achieving 500 ps FWHM from full energy 511 keV gamma-rays in LaBr$_3$. Finally, in 2015, Du et al. [DU—2015] matched the Moszynski results, also using XP20D0 PMTs with LaBr$_3$ at 511 keV, achieving 195 ps FWHM by linear interpolation between samples in a constant fraction algorithm.

In 2014, Paulauskas et al. [PAULAUSKAS—2014] published a careful study of the effects of digitizing speed and pulse amplitude for three digital timing methods. These were: 1) d-CFD implemented on the digitized pulses, using a spline to make the zero crossing interpolation; 2) CFD implemented on a functional fit to the pulses of the form:

$$f(t) = \alpha e^{(t-\phi)/\beta}(1 - e^{-(t-\phi)^4/\gamma}), \quad (2)$$

and, 3) a method they called a Weighted Average Algorithm, which actually estimates the pulse's first moment according to:

$$\phi = \Sigma_{i=\alpha}{}^\beta (y_i - \bar{b}) i / \Sigma_{i=\alpha}{}^\beta (y_i - \bar{b}). \quad (3)$$

Their general findings were that the fitting method gave the best timing resolution, followed by the Weighted Average Algorithm. In many cases the d-CFD gave split timing peaks. Only the functional fitting method gave accurate enough results for their neutron time-of-flight experiment, even though it required that the pulses be analyzed off-line. The best timing between plastic scintillators they achieved was 625 ps, which was at least partially due to their use of PMTs not principally intended for timing studies. This number is to be compared to the 51 ps inherent accuracy of the method when processing pulses from an arbitrary function generator.

To review these results: with fast pulses, as from laser-illuminated SiPMs or timing PMTs, the limits of analog CFD techniques hover about the 100 ps mark. Similar values have been obtained using digital CFD with 4-5 GSA sampling rates. However, at lower sampling rates of 250 MS/s or below, the time resolution degrades markedly, typically to 500 ps or worse.

Similarly, when looking a fast inorganic scintillators, such as LaBr$_3$, analog CFD timing can achieve time resolutions of 140-200 ps, depending upon pulse amplitude, for large energy pulses. These results have been duplicated with 5 GSA digital systems. However, with digitization rates of 100 MS/s or below, achievable resolutions fall to 500 ps or below.

1.4. The Need for Improved Digital Timing Algorithms

FIG. 4 shows a block diagram schematic of a typical digital spectrometer 40. An external sensor 42 is connected (possibly through a preamplifier—not shown) to an ADC 44, which digitizes it signal. The digitized signal is passed to a digital computing device 45 that may contain a field programmable gate array (FPGA) 46, a digital signal processor (DSP) 48, both, or some other equivalent device. The digital computing device typically includes or can access a local memory 50 that can store data for processing or buffer results prior to external transfer. It also typically connects 52 to some external computer system, network or display device to deliver or display its results. Due to cost, power or space constraints, the resources of the digital computing device 45 and memory 50 are still small compared to those of a modern desktop computer.

Because typical FPGA and DSP clock speeds are of order 200-250 MHz, data from faster ADCs cannot be processed directly, but has to be captured in blocks that are somehow then processed in parallel. For example, data from a 500 MS/s ADC is captured in 2 sample blocks at 250 MHz and then reassembled into traces which may then be processed when a pulse is detected. This is a complex process requiring abundant, and therefore expensive, gate array logic, a problem which only worsen as the ADC clock rate rises. Alternatively, the data can be captured and stored and analyzed later, off line. This approach not only adds the cost of the storage and post-processing equipment, but the results are not available for real-time decisions.

On the other hand, while modern processing logic can deal with 250 MS/s digitizers in a fairly straightforward manner, results to date show that achieving the best time resolution (which is still not good compared to either analog timing or very high speed digital timing) requires the use of fitting algorithms which are not readily implemented within the resource constraints of typical digital spectrometers. The resulting need to offload captured pulses for time-of-arrival analysis then limits the pulse rates at which the spectrometers can run. This problem currently precludes the use of digital processing in applications like positron emission tomography, which employs a large number of detector channels, all of which need to run at millions of counts/ second.

It would thus be beneficial to provide a digital timing algorithm with the following characteristics: provides time resolution approaching or matching the best analog time resolutions; does so using data captured by ADC operating at the lower speeds readily amenable to direct processing with current FPGAs and DSPs; and, is simple enough to be implemented within the resource constraints of those FPGAs and DSPs.

1.5. Pulse Amplitude Measurements a) Analog Methods: Pulse peak detection methods are well known in the art of electrical engineering as well as in nuclear instrumentation and are typically some variant of a diode connected to a capacitor so that a charging current flows into the capacitor until the peak voltage is reached and then ceases, thereby recording the maximum. This maximum can be either used in later operations or digitized and stored.

b) Digital Methods: Several digital methods are in use for determining pulse amplitudes, particularly in applications where the amplitude represents some physical quantity, such as the energy deposited in a detector. These are: 1) digitizing the pulse and applying a comparator to extract the maximum value produced; 2) summing the digital values over the pulse region (i.e., integrating the pulse) as a representation of its amplitude; and, 3) fitting an analytic expression to the pulse, as described above in the section of finding times of arrival, and using the peak of the fit as the amplitude.

c) Issues with Existing Methods: The major issues with these methods have already been discussed above in the sections discussing issues in finding a maximum value for use in constant fraction discrimination, and may be summarized as: 1) requiring a high rate of digitization if the pulse peak is not to be missed; 2) issues in knowing where the pulse starts and stops, particularly with pulses from scintillators that, in principal, can extend to arbitrarily long times; 3) fitting functions are sensitive to multiple pulse features and so can produce distortions in their estimates of the maximum value.

It would thus be beneficial to provide a digital algorithm for finding pulse maxima with the following characteristics: provides amplitude resolution approaching or matching the best resolutions provided by analog methods; does so using data captured by ADC operating at the lower speeds readily amenable to direct processing with current FPGAs and DSPs; and, is simple enough to be implemented within the resource constraints of those FPGAs and DSPs.

SUMMARY OF THE INVENTION

Embodiments of the present invention provide a digital processing technique for estimating the value of a characteristic of a digitized electronic signal pulse that includes the time of arrival and/or the maximum value of the digitized electronic signal pulse. The method achieves time resolution approximating that of the best analog techniques while using data from lower speed ADCs and while also being capable of in-line implementation in a field programmable gate array or digital signal processor.

In particular, for a detected signal pulse in the digital data stream, whose baseline, if any, has been subtracted, a method includes: obtaining values of the pulse from regions where it changes as its arrival time offset changes; creating one or more ratios of the obtained values; and using the ratio or ratios as variables in a reference table or equation to generate the estimated value of the characteristic, typically measured relative to one of the digitized signal values.

The reference equation or table is created beforehand by using a secondary technique to study pulses of the type being measured, to establish a calibration relationship between the desired characteristic and the ratio value or values, and to codify it in the equation or table. Secondary techniques may include fitting pulses using an analytic function, digitizing the pulses with a much higher sampling rate ADC, and using an interpolation technique to establish the calibration relationship.

In an implementation intended to find times of arrival, the two largest values are captured and their ratio used with a second order polynomial to determine the difference between the pulse's time of arrival and the time of arrival of the first of the two captured values. In an implementation to estimate the amplitude M of the original pulse, the two values on the pulse's leading edge that bracket a constant fraction of the pulse's amplitude are captured and their ratio is used with a third order polynomial to determine a scaling factor between M and the first captured value.

A further understanding of the nature and advantages of the present invention may be realized by reference to the remaining portions of the specification and the drawings, which are intended to be exemplary and not limiting.

DESCRIPTION OF SPECIFIC EMBODIMENTS

2

2.1. Hardware Considerations

Figure 1:
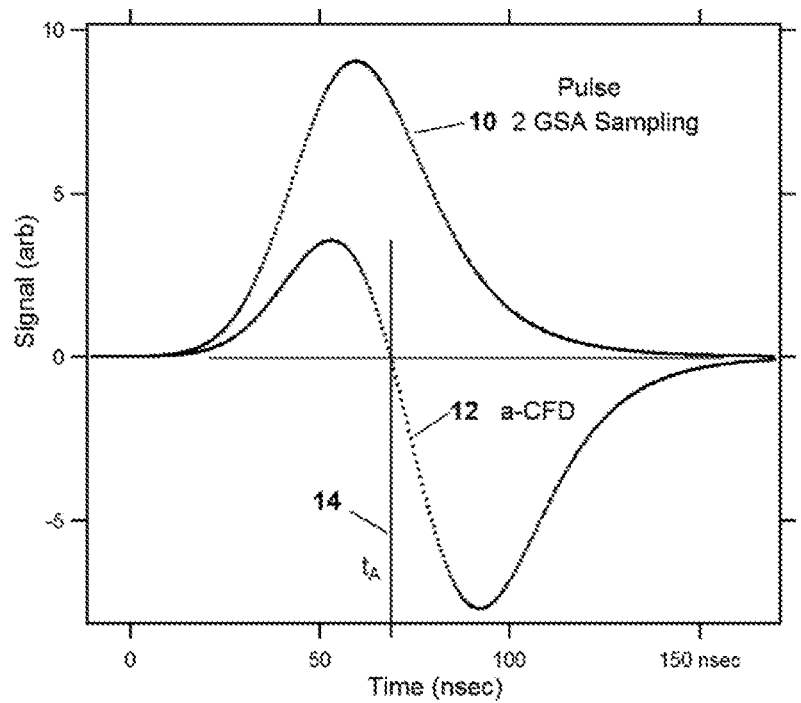
FIG. 1 (Prior Art) shows both an electrical pulse and its transformation into a signal for determining its time of arrival by the constant fraction discrimination method.
Figure 2:
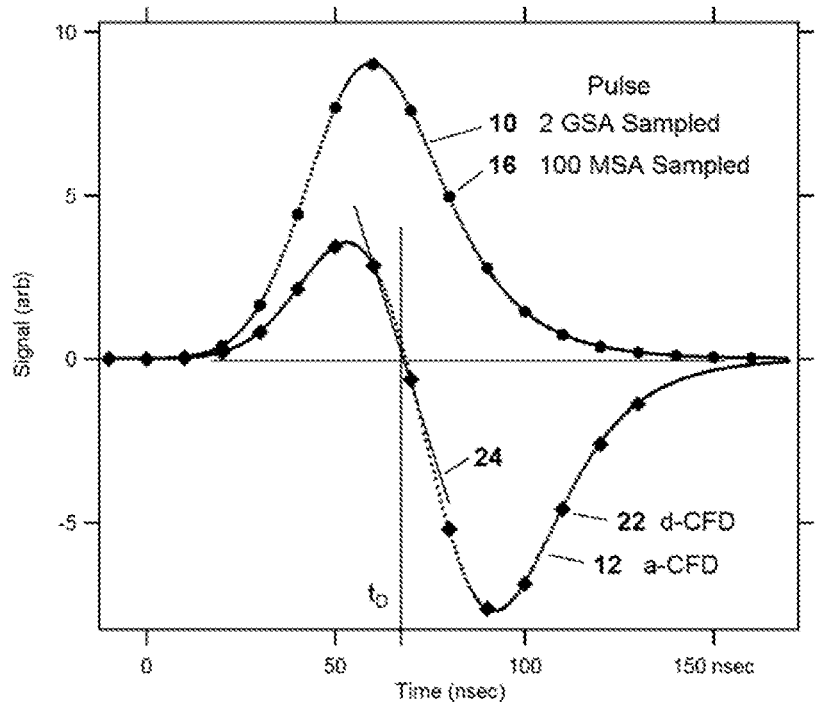
FIG. 2 (Prior Art) repeats the traces of FIG. 1B as they would appear if digitally sampled at 2 GSA and 100 MS/s.
Figure 3:
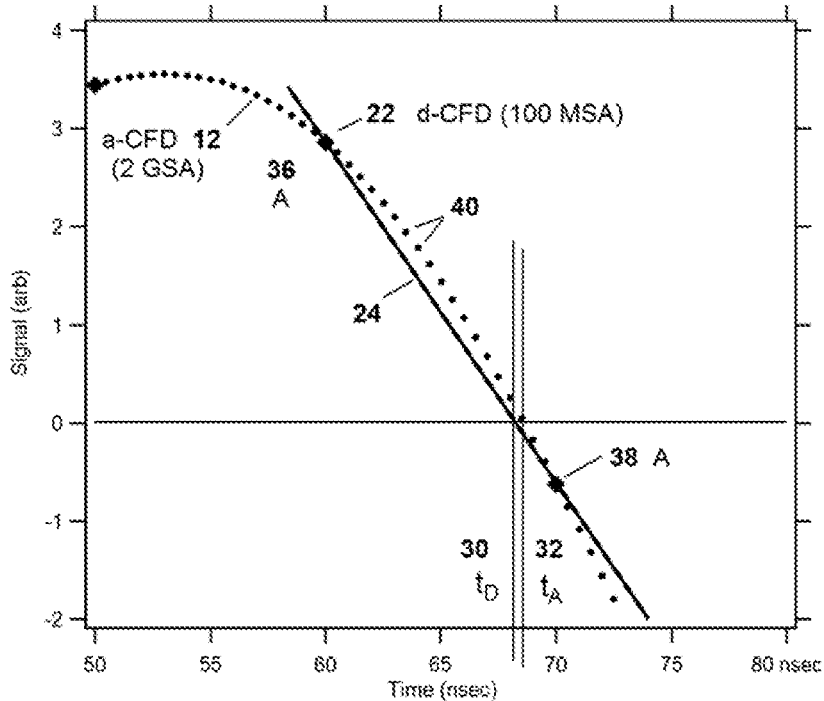
FIG. 3 (Prior Art) shows an expanded view of the zero crossing region of FIG. 2.
Figure 4:
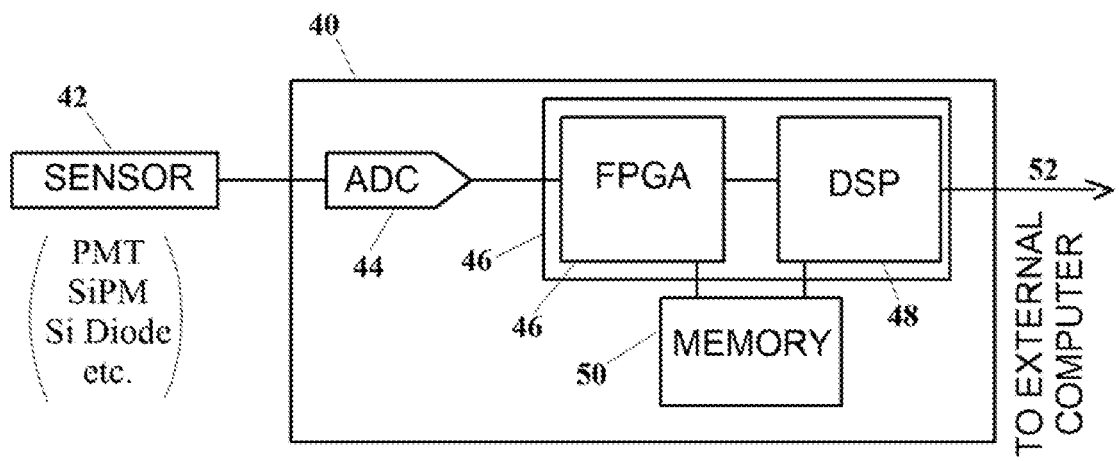
FIG. 4 (Prior Art) shows a block diagram of a typical digital spectrometer.

As discussed above, FIG. 4 shows a typical digital spectrometer 40. The figure is labeled "Prior Art" because the illustrated spectrometer, in its physical form at the level drawn, and when programmed or otherwise configured as described in the Background of the Invention, is conventional. However, the illustrated spectrometer, when programmed or otherwise configured to carry out methods according to embodiments of the present invention, should not be considered prior art. Also, as discussed above, and below in connection with specific embodiments, the spectrometer's digital computing device 45 may contain the field programmable gate array (FPGA) 46, the digital signal processor (DSP) 48, both, or some other equivalent device. Thus, for example, embodiments of the invention can be implemented with or without the illustrated DSP.

2.2. Development of the Method

Figure 5:
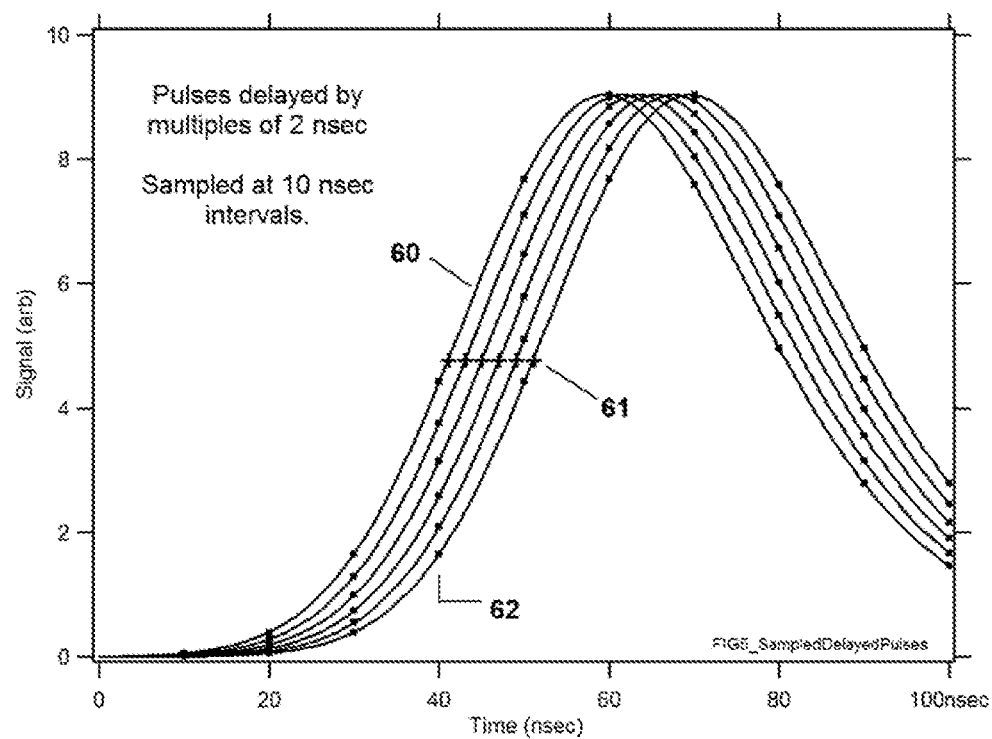
FIG. 5 repeats the trace of FIG. 1, digitally sampled at 100 MS/s with increasing increments of 2 ns in the pulse offset delay.

FIG. 5 shows the result of a conceptual experiment wherein a pulse source is connected to an analog-to-digital converter (ADC) operating at 100 megasamples/sec (MS/s) by a cable that contains a variable delay element. We assume that the Nyquist criterion is met and that there are no frequency components in the pulse at frequencies above 50 MHz. We further assume that the digitized signal either has no baseline value or that it is known and has been subtracted. Baseline correction is a known procedure as shown, for example, in Warburton et al. [WARBURTON—2003]. Hereafter, for clarity, we shall refer to the digitized signal values after baseline correction as "samples of the pulse" or, simply, "samples." When the delay is 0 ns, we obtain the samples (black dots) shown on the leftmost pulse 60. The samples are close enough together to capture the essence of the pulse's shape but are also sufficiently separated that they do not reproduce the finer details of local curvature. As we increase the delay, in units of 2 ns as shown, the entire pulse shifts toward greater times, referred to a fixed sampling point (e.g., 40 ns).

At this point we introduce the concept of arrival time offset ($\varphi$), which is a measure of the offset between the signal pulse and the regular sampling intervals of the ADC. Conceptually, we imagine this as follows: first we consider the ADC's sampling comb (the regular intervals, say at 10 ns for a 100 MS/s digitizer) laid out on a plot with time along the x-axis. Then we place a template of the pulse to be sampled onto the plot and observe where the samples are captured as we shift the template to longer times. FIG. 5 shows an example, with the samples being captured at 10 ns intervals, and the traces offset by 2 ns intervals. We can now define the pulse's arrival time $t_A$ as having two components:

$$t_A = t_L + \varphi, \qquad (4)$$

where the local clock time $t_L$ is the time of the last digital sample before some well-defined feature on the pulse and $\varphi$ is the time difference between that feature and $t_L$.

For example, for constant fraction discrimination (CFD), the well-defined feature will be the point on its leading edge where it equals the constant fraction f of the pulse maximum value M. FIG. 5 illustrates how the location of the 50% constant fraction point x 61 moves with respect to the constant sampling point 62 at 40 ns as the pulses' arrival offset time increases. Obviously, while convenient, this definition of $t_L$ is also somewhat arbitrary, since all the samples are separated from one another by known fixed intervals. Another way of viewing this is that $t_L$ carries the sampling clock time, represented by the ADC samples, while $\varphi$ carries the subsample time between well-defined feature and the nearest preceding ADC sample. Thus, at 100 MS/s, $t_L$ will be in intervals of 10 ns, while $\varphi$ will be in fractions of a nanosecond or picoseconds ranging from 0 to 10 ns.

Figure 6:
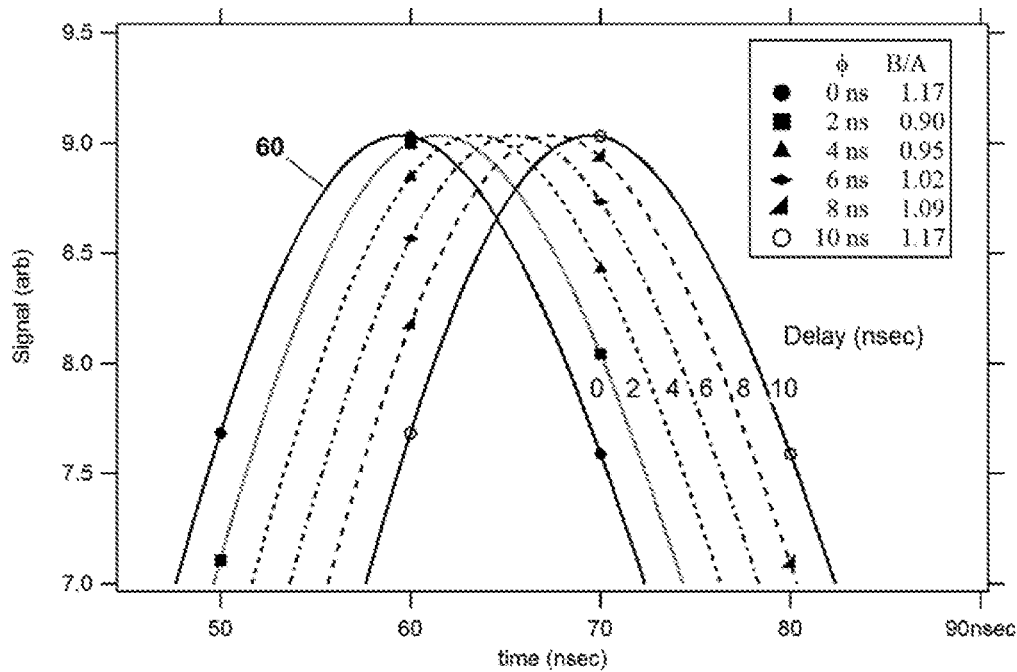
FIG. 6 shows an enlarged view of the peak region of FIG. 5, showing how the samples in the vicinity of the pulse peak move with increasing arrival time offset.

Looking at FIG. 5, for example at 40 ns, we observe that the values of the samples decrease monotonically as the arrival time offset $\varphi$ increases from 0 to 10 nsec. The same is true at many sampling times but is largest at the locations on the pulse where its derivative is largest, here at 40 ns and 50 ns. FIG. 6 shows an enlarged region of FIG. 5 showing the pulses' peaks. Here too we see the same phenomenon, with the values of the samples changing rapidly as $\varphi$ varies. This is particularly true for very narrow pulses.

We therefore posit that, if our pulses have fairly reproducible shapes and vary primarily only in amplitude and arrival time offset, then we can then represent any particular pulse y(t), before digitization, as $$y(t) = HT(t+\varphi), \qquad (5)$$

where T(t) is a fixed curve shape (template), $\varphi$ is its arrival time offset, and H is its amplitude. Thus, if we can determine both H and $\varphi$, we know everything about the pulse. Actually, this assumption need not be met by the entire pulse. For our purposes, it is adequate that only the pulse's leading edge and maximum satisfy EQN. 5.

As we see from FIGS. 5 and 6, the values of the samples, in regions of the pulse where its value changes as the arrival time offset changes, carry information about the value of $\varphi$. The problem, however, is that we do not a priori know the value of H and so cannot tell whether a large captured ADC value at 40 ns, for example, means that we have a small value of $\varphi$ with a small pulse or a large value of $\varphi$ with a large pulse. We therefore need some way to normalize our samples before using them to extract $\varphi$ values. The method we have developed to deal with this issue is to take ratios of the samples. We note immediately that this is not strictly a normalization, since that would involve dividing the points by some value like the pulse maximum, and we do not have such a value, as may be seen from FIG. 6, where it is clear that, for many values of $\varphi$, the maximum captured value is not the pulse peak value. However, as we shall show, this detail is not important to the operation of the method, being taken care of in the procedure that generates the associated reference calibration.

It is also not immediately obvious which points to take a ratio of. On the one hand, the points nearest the peak typically suffer less from signal noise, but are less sensitive to changes in $\varphi$. On the other hand, values on the steep leading edge of the pulse are maximally sensitive to changes in $\varphi$, but may be noisier. As we will show, the method works well with both choices.

2.3. An Arrival Time Implementation Using Peak ADC Samples from Very Fast Pulses In this demonstration, we simultaneously illuminated a pair of side-by-side ADIT L25D19 PMTs in a dark box using a 90 ps pulse of 405 nm laser light from an Edinburgh Instruments EPL-405 diode laser. The EPL-405's output was conducted by fiber optic into the dark box, illuminating a white scattering screen viewed by both of the PMTs. 50% neutral density filters could be inserted to attenuate the beam as desired. The PMTs' outputs were passed to a specialized unity gain Nyquist filter system that allowed the pulses to be filtered with 7 element Bessel filters with 3 dB points of 31, 45, 54, 63, 88, or 125 MHz. The pulses were then digitized using an XIA Pixie-500e, which has a 500 MS/s, 14 bit ADC. Pulses were detected in coincidence and captured to disk in pairs, after which they were analyzed off-line using a custom data analysis program written in IGOR. In the IGOR program we applied the steps described below to extract a value of $t_A$ for each pulse in a pair independently and then histogrammed the differences between them to show achievable time resolutions.

2.3.1. The Basic Procedure

Figure 7:
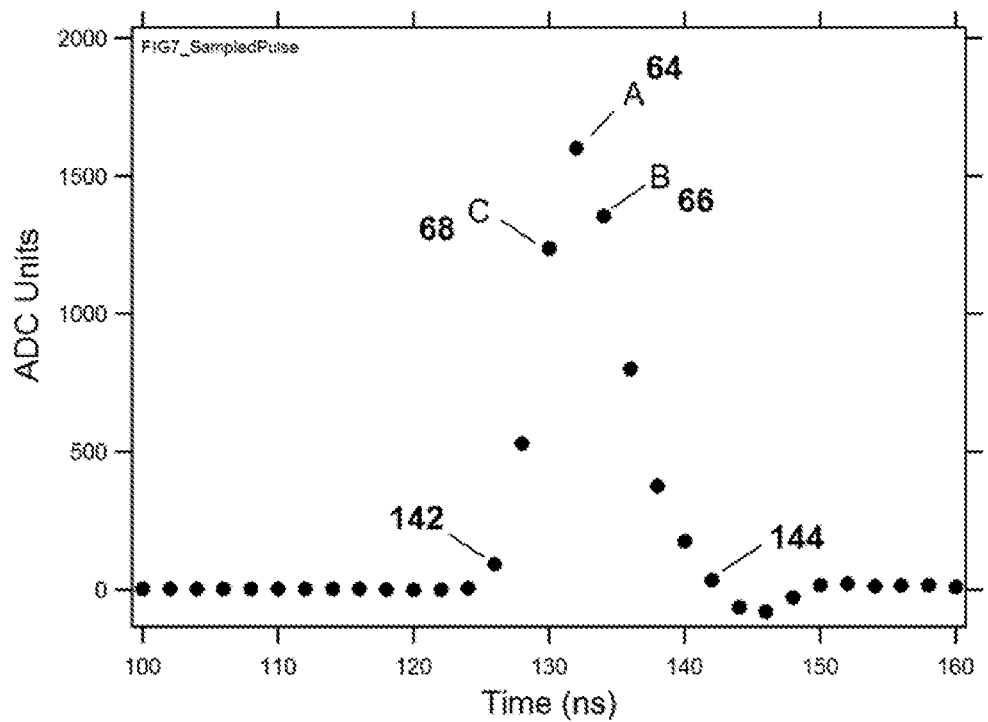
FIG. 7 shows the identification of the two highest points on a digitized trace from a laser illuminated PMT.
Figure 8:
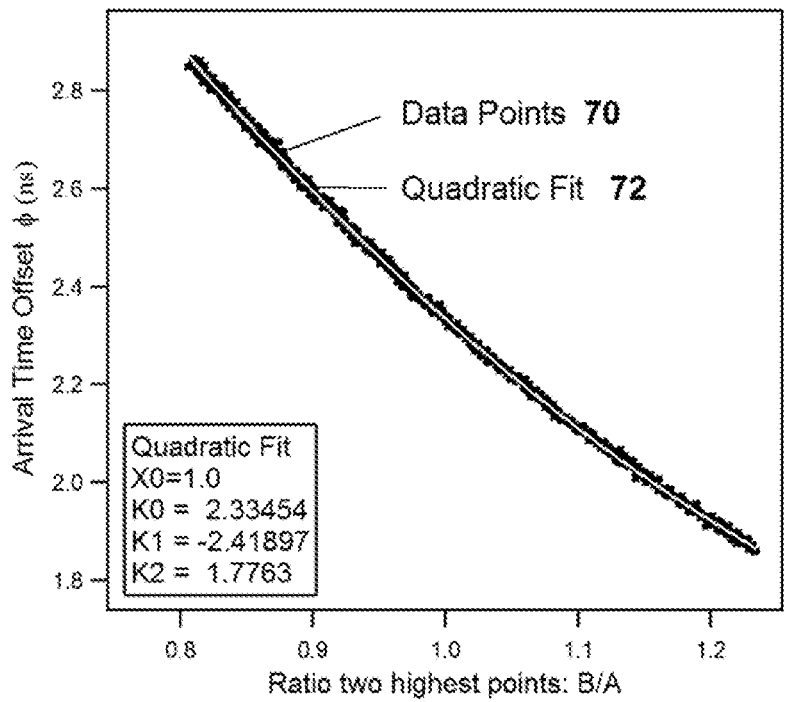
FIG. 8 shows a scatter plot of pulse arrival time offset versus ratio B/A from pulses of the type shown in FIG. 7, together with a quadratic reference fit to the data.

FIG. 7 shows a typical captured PMT output pulse. The first step in our method is to develop a reference curve calibrating arrival time offset $\varphi$ in terms of sample ratios. This process is carried out for each PMT separately, as they typically have different timing characteristics. Therefore, for each PMT, we processed a set of a large number of pulses (typically between 5,000 and 10,000) as follows. For each pulse, after removing the non-zero baseline, we first identified its two largest sample values A 64 and B 66 and took their ratio B/A. Second, we determined φ, using some adequately accurate secondary method, as the time between the pulse's constant fraction point and a reference data point, which we here take to be the earlier of the two largest points, A 64. We will describe three such secondary methods below Then, for all the pulses in the set, we plotted a scatter plot of φ versus ratio B/A, as shown in FIG. 8. As may be seen, the data points fall rather tightly on a simple curve 70, which we fit with a quadratic polynomial 72:

$$\varphi = K0 + K1(R-X0) + K2(R-X0)^2, \quad (6)$$

where R is the ratio B/A. These fits are our reference curves.

Figure 9:
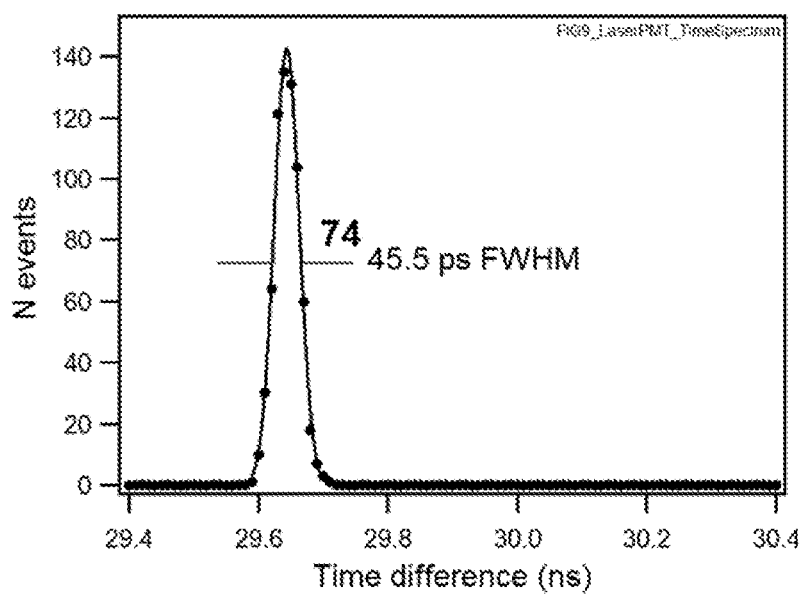
FIG. 9 shows an arrival time spectrum generated from pulses of the type shown in FIG. 7 using the reference curve from FIG. 8.

We then processed the complete data sets. For each pulse in a pair: a) computing B/A for each pulse, b) calculating φ using the reference curves, and c) determining its arrival time by subtracting φ from the A time t(A). Finally to show the accuracy of our method, we computed the time difference $$\Delta t = t_A(B) - t_A(A) \quad (7)$$

between the two $t_A$ values from PMTs A and B and histogrammed the values of Δt. FIG. 9 shows the results from this experiment.

The observed time resolution between two PMTs 74 is well below 50 ps, which is extremely good and exceeds the best literature values that we were able to find, as reviewed earlier. Smaller values have been reported, but only using well defined pulser signals and not signals from a real detector. We note that the best literature values we found were using silicon photomultipliers, which are faster than the PMT used in this experiment, and required digitization rates of order 5 GS/s, which is 10 times faster than our 500 MS/s rate. This method therefore meets our first requirement of not requiring GS/s ADCs to achieve picosecond time resolution.

2.3.2. Secondary Methods for Determining φ

It is clear that the quality of the result shown in FIG. 9 depends critically on the quality of the reference curve EQN. 6, which in turn depends upon the quality of the φ values used to generate the data in the scatter plot FIG. 8. To date we have explored three secondary methods for determining these φ values. The first, given a high quality digital oscilloscope, is to capture a set of calibration pulses using sampling in the 2-10 GS/s range. Each pulse is then readily analyzed using a classical digital CFD timing method to determine its CFD arrival time. Its B/A ratio may be found by marking every $N^{th}$ point to correspond to the desired sampling rate (i.e., every $10^{th}$ point if the oscilloscope sampled at 5 GS/s and the correction curve is desired at 500 MS/s), finding the two highest points A and B and taking their ratio B/A.

A second secondary method is to take a set of one or more pulses and directly fit them using EQN. 5, where T is one of various analytic functions that are known to the art. The pulses can come either from the same equipment or from an oscilloscope and the fit can either be done to the pulses individually and averaged or to the full set of pulses simultaneously. Once T has been determined, its CFD arrival time is readily computed, allowing a set of points of φ versus B/A to be computed by sampling T at the desired ADC collection interval $\Delta t_C$ for various offset values, locating the two maximum value A and B in each case, and computing both B/A and φ between the CFD arrival time and point A. Fitting to the plotted (φ, B/A) points produces the desired reference curve and/or table.

A third secondary method involves finding the CFD arrival time by interpolation, according to the method disclosed by Warburton [WARBURTON—2016]. In this method, the data are conveniently captured by the same equipment that will be used for the timing measurements and the CFD arrival point is found in two steps by first interpolating between the two highest points to find an accurate value of the maximum M and then interpolating between the two data points that bracket the CFD value f·M. As Warburton showed this interpolation method also gives exceptionally good timing resolution, but requires significantly more computation per data point than the present method. Once the constant fraction point has been found, then its separation φ to point A is calculated, and the point (φ, B/A) is placed on a scatter plot as in FIG. 8. As described above, several thousand data points are analyzed and then a reference fit EQN. 6 is produced.

In making the reference fits, it is important to observe that different analytic functions may be necessary, depending upon the shape of the scatter plot. FIG. 8 was a particularly simple case that only needed a quadratic polynomial fit. In other data sets we have found it occasionally necessary to use up to $5^{th}$ order polynomials to achieve the best results and it is easy to imagine cases in which other analytic forms using power laws, inverse Gaussians, or trigonometric functions may be appropriate. Simple polynomials are the preferred form, however, because of the ease with which they can be computed in gate arrays. The following piece of pseudocode demonstrates the method, where the coefficients are K[i], there is an offset X[0], which may be negative (see EQN. 6 for an example), and only multiplications and summations are required:

```
R = B/A + X0                               (8)
Sum = K[0]
Val = 1
For (i=1; i<=N; i+=1)
    Val = Val * R
    Sum = Sum + K[i] * Val
EndFor
```

2.3.3. Tests with Multiple Ratios

The above implementation used only a single ratio B/A to find arrival time offset φ values. Looking at FIG. 7, one might well ask if it would be advantageous to also form more ratios, adding, for example C/A and combining it with B/A to reduce any noise effects. We investigated this possibility, using up to four ratios, which we combined with various weighting schemes and then plotted against φ. Using the data sets currently available to us, which come from only a few PMTs and scintillators, we found that there was no significant advantage in using multiple ratios. However, with different signal sources having different statistical and noise properties, there may be cases where adding additional ratios may be useful and this possibility should always be considered when applying the method to a new signal source.

2.4. Choice of Reference Data Sample

In the implementation above we selected the earlier captured sample A as our reference data point $t_L$ for determining measuring the local clock time. While, clearly, any point on the pulse might be used, we want a well-defined point and also prefer to avoid having to capture more samples than necessary. Thus our preferred candidates for the reference point are samples A or B and we have chosen A merely for consistency throughout our demonstrations.

2.5. An Arrival Time Implementation Using Leading Edge ADC Samples

While the preceding implementation works extremely well for sharply peaked pulses, many signals may not meet this criterion. In particular, many scintillators, such as NaI (Tl), have fast risetimes in the nanosecond range but much slower fall times, approaching microseconds. For these signals it is clearly advantageous to choose ratio samples from the pulses' leading edges.

Figure 10:
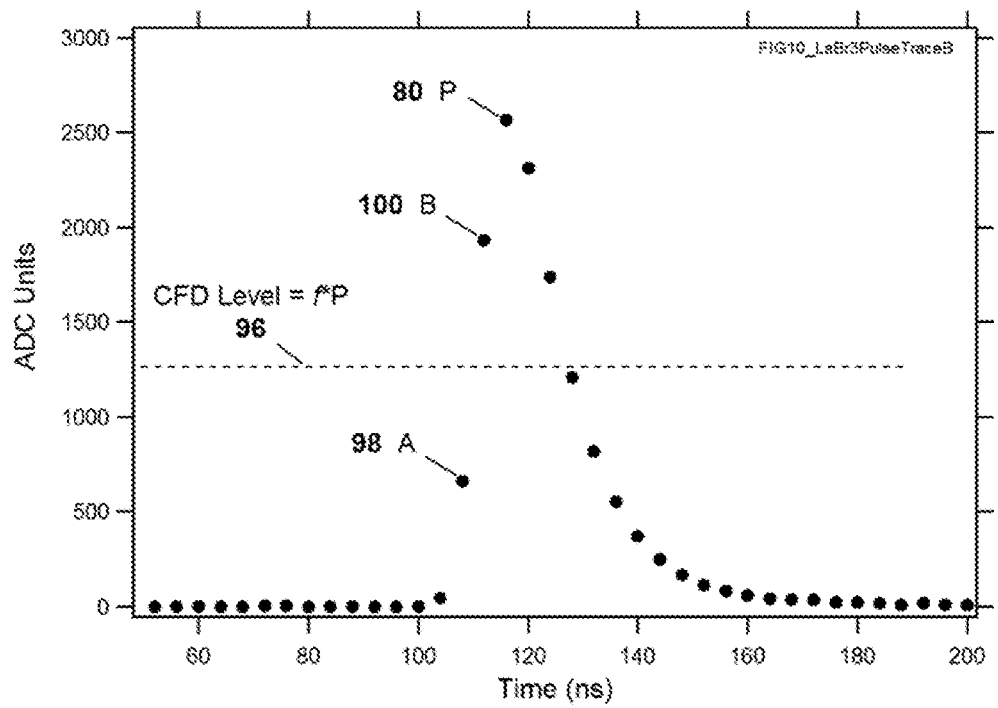
FIG. 10 shows the selection of the two points bracketing a constant fraction level f*M on the leading edge of a pulse from a $LaBr_3$ scintillator attached to a PMT, digitized at 250 MS/s.

To demonstrate this implementation, the same two PMTs used above were coupled to two 1" diameter, 1" long LaBr$_3$ crystals, which were then placed parallel to each other with a separation of about 1 cm with a weak $^{60}$Co source placed between them. The PMT signals were filtered using a 5$^{th}$ order Bessel filter whose −3 dB point was at 45 MHz to satisfy the Nyquist criterion. Coincidence traces were captured using an XIA Pixie-16 with a 250 MS/s, 14 bit ADC and analyzed off-line using the same program as above. Pulses from a single PMT, still for coincidence events, were histogrammed to produce energy spectra. Pulses from pairs were analyzed for their arrival times and the differences histogrammed to produce coincidence time resolution spectra. FIG. 10 shows a typical pulse whose maximum is labeled P 80.

Figure 11:
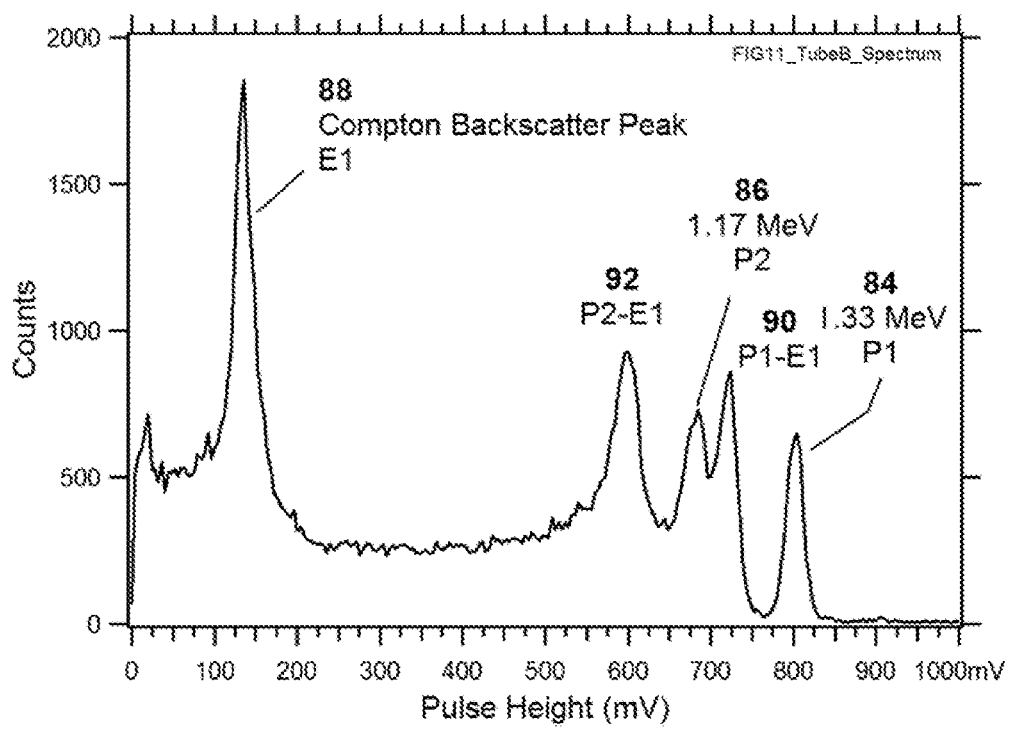
FIG. 11 shows a spectrum of pulse heights obtained by placing a $^{60}Co$ source between two $LaBr_3$ scintillators, each coupled to a fast PMT.

Histogramming M values produces an energy spectrum, as shown in FIG. 11. FIG. 11 has not been calibrated in energy units but instead shows the amplitudes of the detected pulses directly in mV. While $^{60}$Co only has two major gamma-ray lines at 1.33 MeV (P1 84) and at 1.17 MeV (P2 86), the collected spectrum has far more structure arising from the geometry of the setup and the relatively low likelihood of the gamma-rays absorbing in the 1" LaBr$_3$ crystals. The major interactions are: 1) full photoabsorption—leading to the peaks P1 84 and P2 86; 2) Compton backscatter—leading to the single E1 peak 88—because the deposited energy in backscatter is nearly independent of photon energy; 3) Backscatter followed by full photoabsorption—leading to the peaks P1-E1 90 and P2-E1 92; and 4) Compton scattering at other angles—leading to the continuum 94 between E1 88 and P2-E1 92. The upshot of these processes is that we have a spectrum that is nearly continuously populated with pulse amplitudes ranging from 0 to over 800 mV in amplitude.

The range in pulse amplitudes is generally important since it allows the various timing methods to be tested as a function of pulse amplitude. For the present demonstration we will restrict ourselves to pulses that are at least 100 mV in amplitude so that our results will not be excessively degraded by electronic noise and limited numbers of ADC bits in the digitization.

Figure 12:
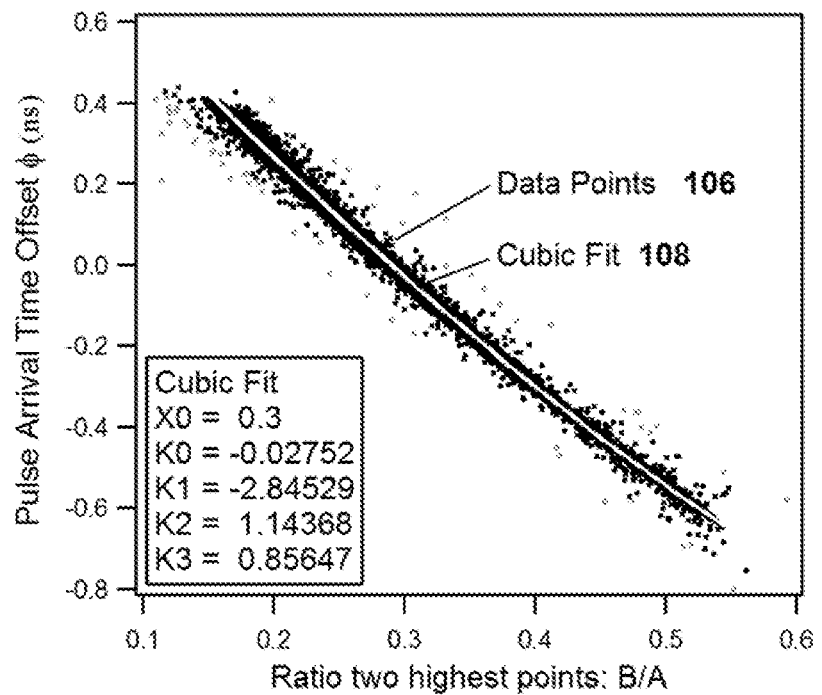
FIG. 12 shows a ratio-reference scatter plot of pulse arrival time offset versus ratio B/A from pulses of the type shown in FIG. 10, together with a cubic fit to the data.

Returning to FIG. 10, the reference generating process begins, after removing the pulse's baseline, by first locating the pulse maximum P 80 and then computing a constant fraction level f·P, 96 where f is the constant fraction value. Next, we locate the two samples A 98 and B 100 bracketing f·M, and form their ratio R=B/A. As in the preceding implementation, we then compute the arrival time offset φ relative to sample A 98 using a secondary method. Proceeding as before, we then make a scatter plot of the found (φ, B/A) values for 5,000 to 10,000 pulses and fit the plot using a polynomial to obtain a reference curve. FIG. 12 shows data points 106 from one of the PMTs with its LaBr$_3$ scintillator together with a cubic fit 108 to the data.

Having created reference curves for both PMTs, the data files are analyzed by the steps of, for each pulse in coincident pair, again after removing non-zero baselines: first, finding its maximum P; second, calculating the constant fraction value f·P; third, finding the samples A and B that bracket f·P and taking their ratio R=B/A; fourth, using the reference curve to compute the arrival time offset φ relative to the time of sample A in order to obtain the pulse's arrival time $t_A$; fifth, taking the difference between the values of $t_A$ from the two pulses in the coincident pair to find the time delay between them; and, sixth, histogramming these time delays to obtain the system's time resolution.

Figure 13:
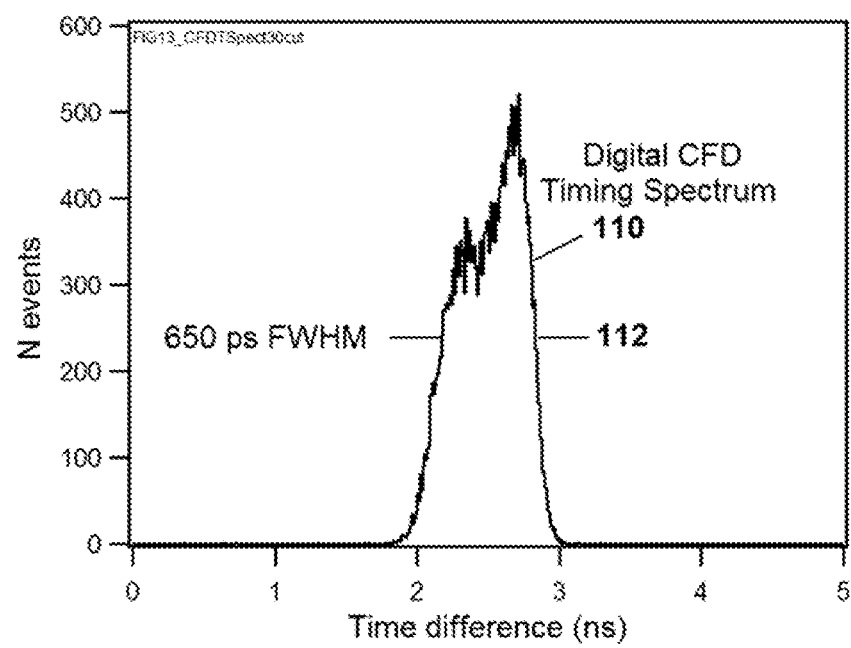
FIG. 13 shows a time coincidence spectrum from the pulses in FIG. 12 above 100 mV in amplitude using prior art constant fraction discrimination.
Figure 14:
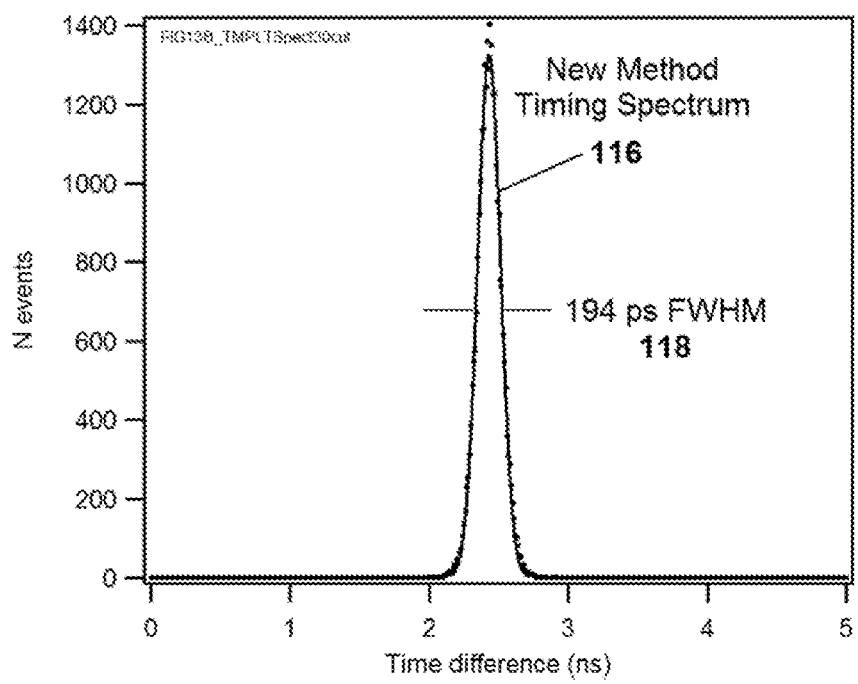
FIG. 14 shows a time coincidence spectrum from the pulses in FIG. 12 above 100 mV in amplitude using the ratio B/A together with the ratio-reference curve of FIG. 11 to measure pulse offset delays.

FIG. 13 shows the time resolution for this data set computed using a prior art CFD algorithm. As may be seen the peak 110 is non-Gaussian and relatively wide, at 650 ps. 112. The reasons for this peak shape have been discussed elsewhere by Warburton [WARBURTON—2016]. FIG. 14 shows the time resolution using the inventive ratio-reference method. The peak 116 is Gaussian and also narrow, with a FWHM of 194 ps (118). This value is as good as the best analog values reported in the literature, as reviewed earlier, and by digital spectrometers operated at 5 GS/s. The result therefore meets our requirement of achieving state of the art timing resolution but with a digitizer operating at least an order of magnitude more slowly (250 MS/s vs 5 GS/s).

2.6. Modified Methods for Measuring Time of Arrival

2.6.1. Ratios Using Separated Pulse Samples

In the preceding example we measured time of arrival using samples that bracketed the constant fraction value f·P. However is not a necessary feature of this invention that samples be contiguous. Instead, looking at FIG. 10, we see that another reasonable choice would be to select as point A the data sample closest to the CFD level f·P and taking point B to be the second following sample after A. In FIG. 10, then, point A would be the sample labeled "A" 98 and point B would be the sample labeled "P" 80. Using this selection of samples, for pulses with the shown risetime, point B would always be close to the pulse peak and points A would scatter on both sides of f·P. Defining the ratio R=A/B, would result in both a larger range of R values and increased linearity from the proximity of A values to f·P, where the leading edge is most linear. By this we demonstrate that the method is flexible both in the locations of the data points used and in the definition of the ratio R.

2.6.2. Ratios Using Interpolated Pulse Values

In the discussion following EQN. 5, we noted that the reason we were taking ratios of pulse samples was because we did not a priori know the pulse amplitude H and so could not normalize our measured samples. If we did know H, then we could define our ratio values as R=A/H and proceed as before. This approach could be considered an extension of the method described in Section 2.5.1, where the point B, instead of being close to the maximum is replaced with H, which is the maximum. Considering this, we note that Warburton's [Warburton—2016] method for measuring arrival time by interpolation includes the step of determining the pulse's amplitude using interpolation and that the method can be implemented in a gate array, which meets our implementation requirement. Thus we could use Warburton's interpolation method to obtain a value for H from our captured trace and otherwise implement the present method as described. Of course Warburton's method is not unique and other methods known to the art for obtaining a value of the pulse lying between two captured sample values could also be used.

In other cases, particularly with scintillators, the value of H may not be particularly well defined because of photon emission statistics. In this case it may be useful to average several captured pulse samples in the vicinity of the peak to obtain a more accurate estimate of the true value of H. Our intent here is to emphasize that, when we claim "values of the pulse above baseline," we are not simply limited to the actual captured samples, but may also perform mathematical operations on them prior to forming the ratios. Whether it is advantageous to do so must be decided on a case-by-case basis, since significant additional computational resources may be required.

2.7. An Amplitude Implementation Using Peak ADC Samples

Up until this point we have only discussed finding one specific characteristic of the sampled pulse, its arrival time. However the method is not limited to this case and can be used to find any well-defined pulse feature. In particular, it can be used to find pulse maximum values, which are often of interest as a measure of some physical phenomenon such as, in the case of nuclear measurements, the energy of a photon or particle striking a detector.

We demonstrate a first implementation of this application by measuring the amplitudes of pulses generated by the trigger circuit of the Edinburgh Instruments EPL-405 diode laser described above. This trigger is an electronically generated pulse that is about 4 ns wide with rise and fall times of less than 1 ns. These signals were Nyquist filtered using a 65 MHz −3 dB Bessel filter and digitized at 500 MS/s as described earlier. After filtering they are still a little bit faster than the PMT pulse shown earlier in FIG. 7, but have much the same shape. The same general reference generating procedure was employed as described above, with the only difference being that, instead of making a scatter plot of ($\varphi$, B/A), where A 64 and B 66 are the two highest samples on the digitized pulse, we plot (dM, B/A), dM an amplitude correction factor defined as:

$$dM = \left(\frac{M-P}{M}\right) = \left(1 - \frac{P}{M}\right), \quad (9)$$

where P is the maximum sample captured from the pulse and M is a best estimate of its maximum, as found using a secondary method, also as described above. In the present example M is found by interpolating between the two highest samples.

Figure 15:
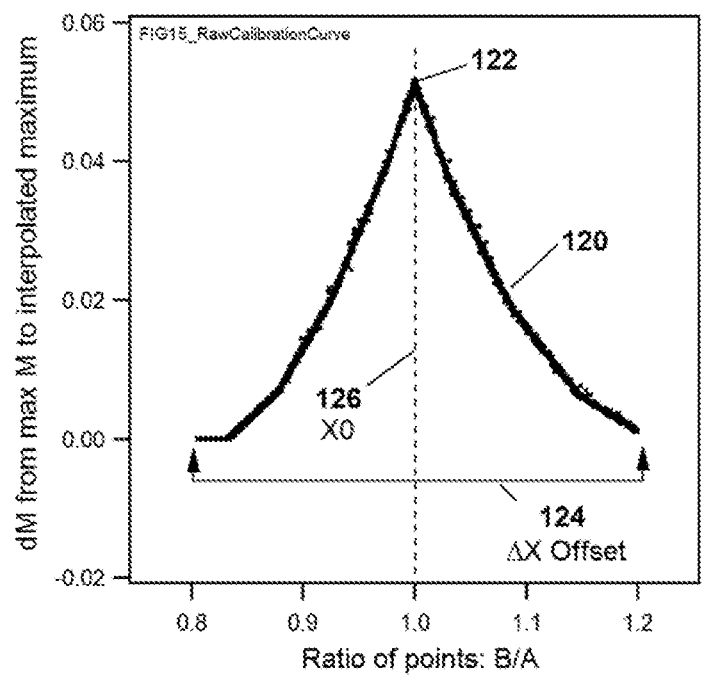
FIG. 15 shows a raw ratio-reference scatter plot of pulse amplitude correction dM versus ratio B/A from digitized laser trigger pulses.
Figure 16:
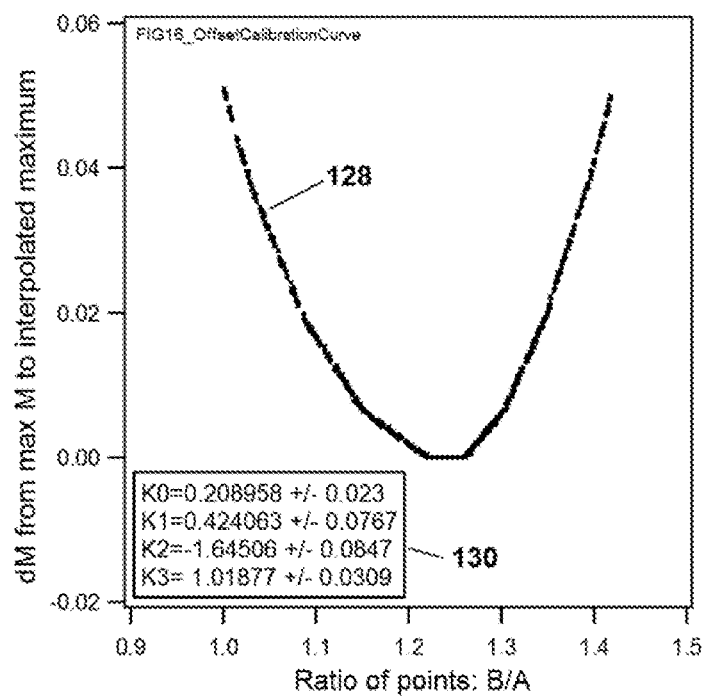
FIG. 16 repeats FIG. 15 with all points below 1.0 offset by 0.40, together with the results of a cubic fit to the points.

The resulting scatter plot typically has a shape 120 as shown in FIG. 15. While this can be fit by a pair of polynomials on each side of the maximum 122, we have found it convenient to instead add an offset $\Delta X$ 124 to B/A values falling below the value X0 126 corresponding to the maximum dM value. This transforms the curve 120 into the curve 128 shown in FIG. 16, which is easily fit with a simple cubic polynomial with the shown coefficients 130. Once we have generated the reference curve dM(B/A), we can then proceed to processing the entire data set, for each pulse calculating B/A, using the reference curve dM(B/A) to provide an estimate of the amplitude correction factor dM, using dM and the pulse's peak value P to estimate its maximum value according to:

$$M = \left(\frac{P}{1-dM}\right), \quad (10)$$

which follows directly from EQN. 9. The resultant M values can then be histogrammed to produce an energy spectrum.

We note that EQNs. 9 and 10 are not unique. For example, one could replace EQN. 9 with dM=P/M, with EQN. 10 then becoming M=P/dM.

Figure 17:
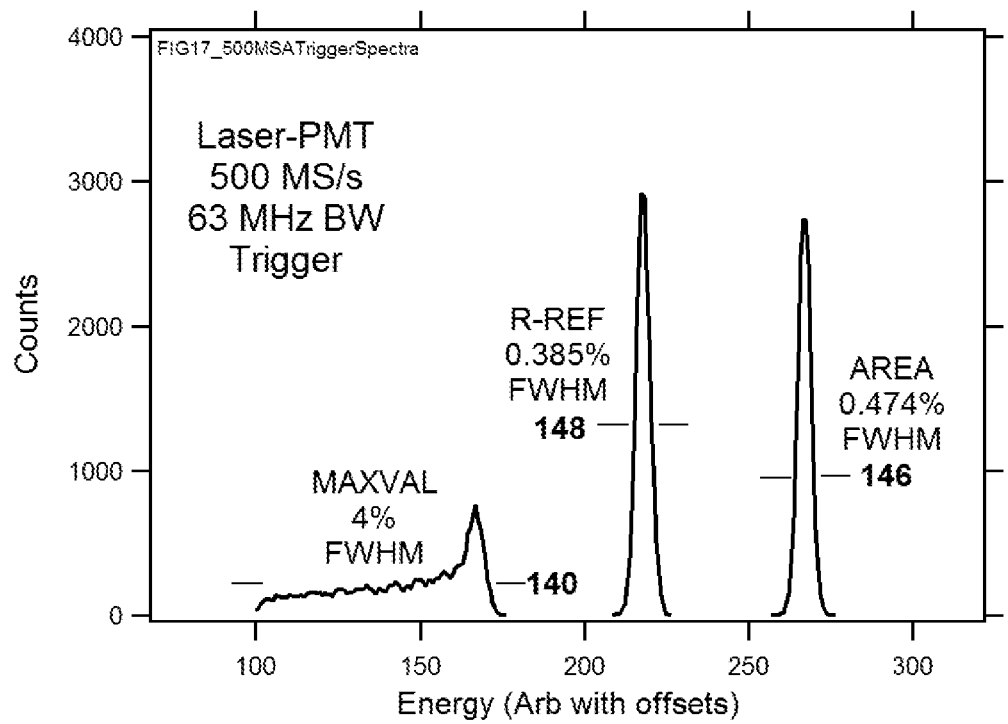
FIG. 17 compares the amplitude resolutions from the laser trigger pulses, digitized at 500 MS/s, using prior art amplitude search, prior art area summation and the inventive ratio-reference method.

FIG. 17 compares amplitude histograms obtained by two prior art techniques to the present result. Simply using the maximum value of each pulse results in the MAXVAL distribution 140, whose resolution is only 4%. As we would expect from an examination of FIG. 7, only a relatively small fraction of all pulses have a sample that lands close to the peak value. The second common prior art method for obtaining pulse amplitudes is to measure their areas, assuming that area and amplitude are tightly correlated. Thus, in FIG. 7, sample values between points 142 and 144 would be taken as the area and then divided by a constant to obtain the amplitude. The AREA peak 146 in FIG. 17 shows the result. At 0.474% FWHM it is far better than the MAXVAL method and reflects the narrow range of amplitudes produced by the electronic pulser. The peak labeled R-REF, 148 presenting the results of the present ratio-reference method, is seen to be even slightly superior to the AREA method, producing a FWHM of 0.385%. Since this result is about a factor of 10 smaller than the inherent energy resolution found in such fast energy measurement techniques as PMTs or silicon photomultipliers coupled to scintillators, our ratio-reference technique can be expected to deliver physics-limited energy resolutions.

2.8. An Amplitude Implementation Using Leading Edge ADC Samples.

In our final implementation, we test the idea that the presented ratio-reference method can deliver physics-limited energy resolutions by reanalyzing the data taken from $^{60}$Co using the LaBr$_3$ detectors, as described above. In this case we repeat a portion of the reference generating procedure described in Section 2.3 to obtain B/A ratios on the pulses' leading edges, but then make a scatter plot of these values with values of dM (EQN. 9) obtained by a secondary method as described in Section 2.4. We fit the scatter plot to obtain a reference equation dM(B/A) and can then analyze the data set, for each pulse calculating B/A, using the reference equation dM(B/A) to provide an estimate of the amplitude correction factor dM and then solving EQN. 10 to obtain an estimate of the peak maximum M. The resultant M values can then be histogrammed to produce an energy spectrum.

Figure 18:
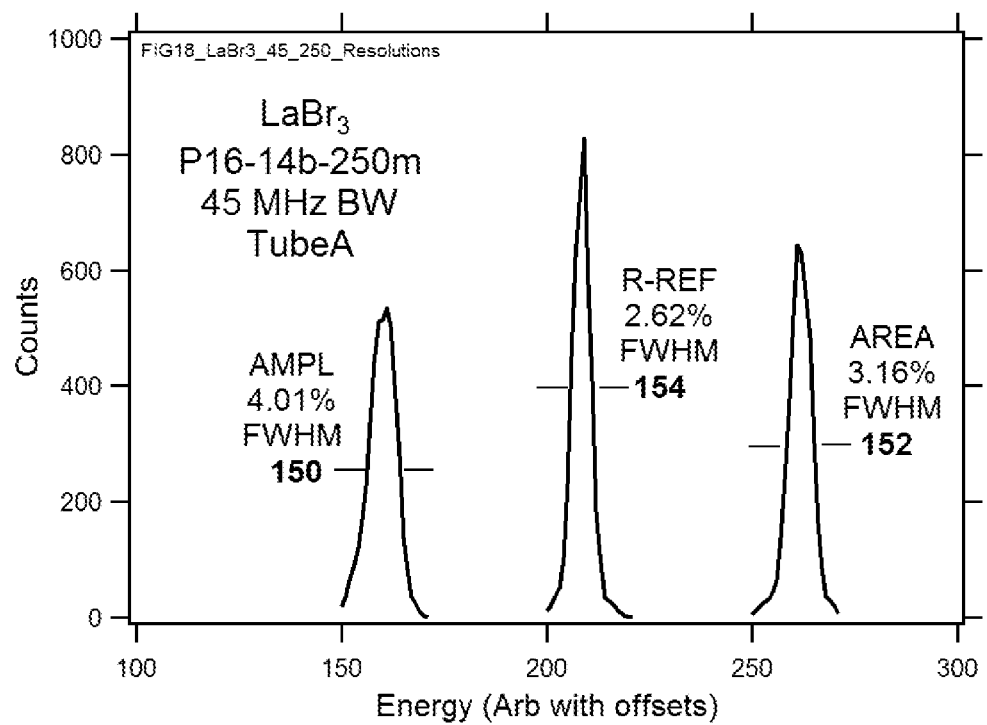
FIG. 18 compares the amplitude resolutions from $LaBr_3$ $^{60}Co$ pulses, digitized at 250 MS/s, using prior art amplitude search, prior art area summation and the inventive ratio-reference method.

In the present case we restricted our analysis to pulses exceeding 760 mV in amplitude (FIG. 11) to only produce a spectrum of the 1.33 MeV gamma-rays. FIG. 18 shows a comparison between the same two prior art techniques described in Section 2.5—MAXVAL 150 and AREA 152—and the present ratio-reference method R-REF 154. Because of the slower pulses, MAXVAL does a comparatively better job than before, achieving 4% energy resolution, while AREA achieves 3.16%. The present method, TMPL 154 achieves the best energy resolution, 2.62%, which matches both the best analog results and the best digital results obtained using much faster digitization rates. Our results therefore appear to be physics-limited, as desired.

2.9. Gate Array Implementation

As discussed earlier, an inventive aim was to produce a method that could be implemented in a field programmable gate array, digital signal processor, combination of the two, or other in-line computing device so that pulses could be processed for their arrival times and/or amplitudes in-line, removing the expensive steps of capturing and storing pulses to disk for later analysis and enabling real time analyses.

Figure 19:
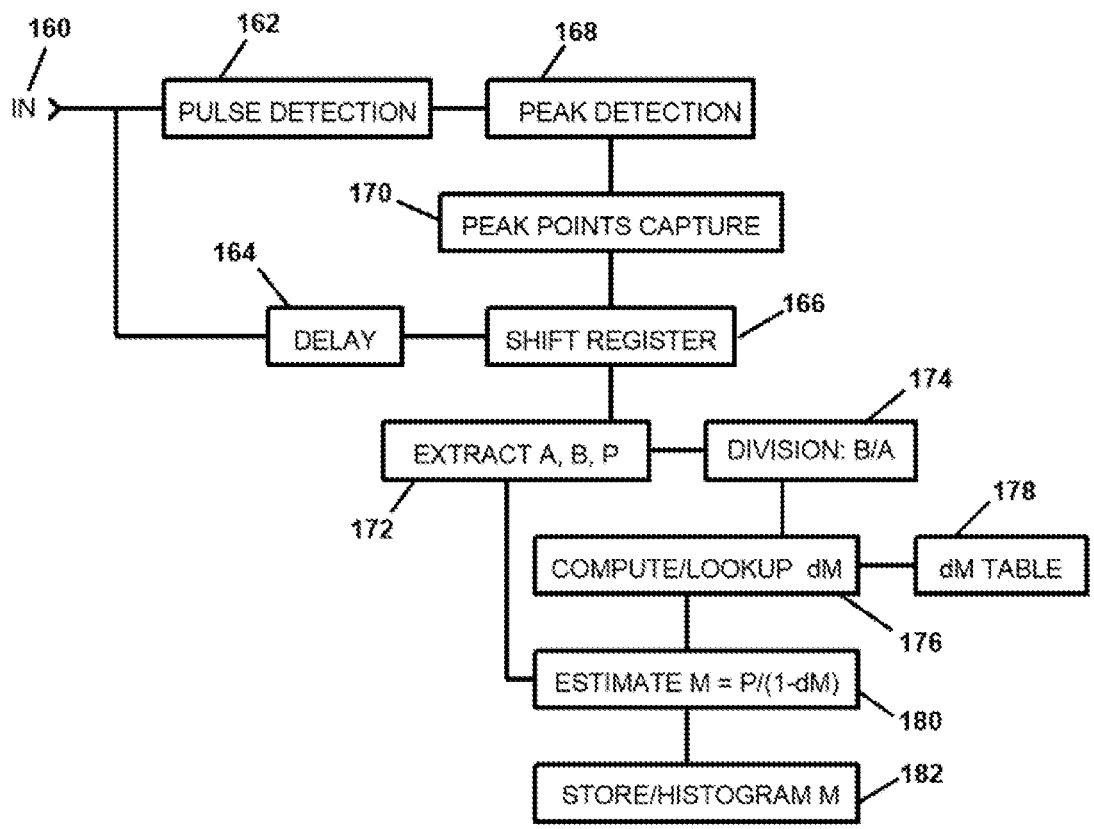
FIG. 19 shows a block diagram of one implementation of the inventive ratio-reference algorithm as it would be implemented in a field programmable gate array.

FIG. 19 outlines the steps by which the third version of the inventive method—Section 2.4—amplitude measurement using peak ADC samples—may be implemented in-line in a digital spectrometer 40 (see FIG. 4), using either the FPGA 46, DSP 48, or some combination of the two in order to allow input pulses from the sensor 42 to be processed in real time as rapidly as they are received.

In this implementation, the digital data stream 160 is connected to PULSE DETECTION logic 162 and also to a digital DELAY 164 that feeds a SHIFT REGISTER 166. The PULSE DETECTION logic uses methods that are well known in the art and typically include a threshold crossing by either the signal itself or by a filtered version of the signal. See, for example, the discussion of the fast trigger filter in [WARBURTON—1997; WARBURTON—1999]. Once a pulse is detected, the signal stream is further parsed by PEAK DETECTION logic 168 to detect the pulse maximum. This detection triggers the PEAK POINTS CAPTURE logic 170 which compensates for local processing delays to cause the pulse's peak value and two bracketing values to be captured into the EXTRACT A, B, P logic 172 which examines them, determines the values of the two largest samples A and B and saves the largest value as P. The values A and B are passed to the DIVISION: B/A logic block 174, which computes the ratio B/A, while the value of P is passed to the ESTIMATE M 180 logic. The ratio B/A is input to the COMPUTE/LOOKUP dM 176 block which computes an estimate of dM.

As discussed in detail above, dM can be computed by a variety of methods, including direct computation from the coefficients of the reference fit curve and from a lookup table. In the implementation shown in FIG. 19, a lookup table dM TABLE 178 is used. In this case the value of B/A is used as an address to extract either a single value of dM, or else a pair of dM values for interpolation. The estimated value of dM is then passed to ESTIMATE M 180 where, together with the value of P, it is used to compute an estimate of the peak amplitude M. The STORE/HISTOGRAM M 182 logic block can then histogram the value of M or otherwise record it to disk, together with any additional information about the pulse that may be extracted by other analysis processes. In particular, by applying appropriate scaling, the value M may be stored as an estimate of the energy of the detector event producing the pulse.

The design shown in FIG. 19 is pipelined, meaning that the logic can begin pulse detection on a second pulse before it has finished computing M on a first pulse. However, this design is not unique and, given modern logic and computing resources, those skilled in the art will readily devise many alternative hardware designs to implement the inventive method. For example, following pulse peak detection, the three maximum samples on the curve could be easily captured in a small shift register that was part of the PEAK DETECTION 168 logic and their values recorded to a data buffer that would be processed sequentially, but not in real time, by an attached digital signal processor. Such a design would be perfectly adequate for a simple energy spectrometer, but might not satisfy the needs of a more advanced nuclear physics experiment where larger scale decisions about data capture may depend upon having pulse amplitude values in real time.

2.10. Extensions to Other Pulse Characteristics

In the preceding sections we have presented implementations to estimate two pulse characteristics—amplitude and time of arrival. The proposed method is not so limited however and other characteristics can also be extracted by similar means. In particular, we can consider such characteristics as pulse risetime, pulse width as well as situations where the detector produces pulses of varying widths. In the case of risetime, for example, it is clear that if, instead of capturing the two highest values, one the peak value and a value a known number of samples earlier, then this ratio would carry risetime information and could be used in conjunction with another ratio to separate risetime and amplitude variables. Similarly, samples separated by an amount comparable to the pulse width will carry pulse width information. Finally, we observe that our method is based on the assumption of there being a single curve shape or template that describes all the pulses. When this is not the case, one can employ a first ratio to select the appropriate curve shape and a second ratio to extract the desired characteristic. Or, considered differently, one could use the two ratios to construct a 2-dimensional reference function to produce an estimate of the desired characteristic as a function of the two ratio values.

3 References

The entire disclosures of all the references mentioned above and listed below are hereby incorporated by reference for all purposes.

U.S. Patent Documents

| BURNS - 1995 | 5,382,848 | January 1995 | Burns and Tso |
|---|---|---|---|
| HASELMAN - 2011 | 8,003,948 | August 2011 | Haselman, Miyaoka, Lewellen, and Hauck |
| HAW - 1973 | 3,763,436 | October 1973 | Haw |
| KELLY - 1993 | 5,266,953 | November 1993 | Kelly, Biggs, Ireland, Drutch, and Winter |
| VERNON - 2008 | 7,411,199 | August 2008 | Vernon |
| WARBURTON - 1997 | 5,684,850 | November 1997 | Warburton and Hubbard |
| WARBURTON - 1999 | 5,873,054 | February 1999 | Warburton and Zhou |
| WARBURTON - 2003 | 6,609,705 | August 2003 | Warburton, Harris, and Grudberg |
| WARBURTON - 2016 | U.S. patent application No. 15/332,941, filed Oct. 24, 2016, for "Interpolation Measurement of the Arrival Time and/or Amplitude of a Digitized Electronic Pulse" (inventor William K. Warburton) | | |

Other Publications

| BARDELLI - 2004 | Bardelli et al., "Time measurements by means of digital sampling techniques: a study case of 100 ps FWHM time resolution with a 100 MSample/s, 12 bit digitizer", NIM_A 521, 480-492 (2004). |
|---|---|
| BUZHAN - 2003 | Buzhan et al, "Silicon photomultiplier and its possible applications", NIM_A 504, 48-52 (2003). |
| DU - 2015 | Du et al., "Study of time resolution by digital methods with a DRS4 module", arXiv: 1506.07219 24 Jun. 2015. |
| FALLU-LABRUYERE - 2007 | Fallu-Labruyere et al., "Time resolution studies using digital constant fraction discrimination", NIM_A, 579, 247-251 (2007). |
| HASELMAN - 1997 | Haselman et al., "Simulation of algorithms for pulse timing in FPGAs", 2007 IEEE Nucl. Sci. Symp. Conf. Record 4: 3161-3165 (1997). |

| KNOLL - 2000 | Knoll, Chapter 17_IX_A "Time Pickoff Methods" in *Radiation Detection and Measurement* (Wiley, New York, 2000), pp. 659-665. |
|---|---|
| MOSZYNSKI - 2005 | Moszynski et al., "New Photonis XP20D0 photomultiplier for fast timing in nuclear medicine," NIM_A, 567, 31-35 (2006). |
| MUTTI - 2013 | Mutti et al., "FPGA implementation of a digital constant fraction discriminator for fast timing in the picosecond range", Poster TUPPC083, Proc. ICALEPCS2013 (San Francisco, CA 2013), available at accelconf.web.cern.ch/AccelConf/ICALEPCS2013/papers/tuppc083.pdf. |
| PAULAUSKAS - 2014 | Paulauskas et al., "A digital data acquisition framework for the Versatile Array of Neutron Detectors at Low Energy (VANDLE)", NIM_A, 737, 22-28 (2014). |
| RONZHIN - 2010 | Ronzhin et al., "Tests of timing properties of silicon photomultipliers", FERMILAB-PUB-10-052-PPD or SLAC-PUB-14599. |
| TIEGE - 2005 | Tiege et al., "Photomultiplier pulse timing using flash analog-to-digital converters", GlueX Note - zzz, Jan. 24, 2005, available at https://userweb.jlab.org/~brads/Manuals/Hardware/JLab/FADC/timing_extraction/Tiege-FADC_timing_algorithm-Jan2005.pdf. |
| WANG - 2016 | Wang et al., "Waveform timing performance of a 5 GS/s fast pulse sampling module with DRS4", available at arXiv.org at https://arxiv.org/pdf/1501.00651. |
| WOLBERG- 2004 | Wolberg, Chapter 39 "Sampling, Reconstruction and Antialiasing", in *Computer Science Handbook*, 2$^{nd}$ Ed., A. B. Tucker, Ed. in Chief, (CRC Press, New York, 2004). |

4 Conclusions

In the foregoing description of specific embodiments we have shown two examples of a general digital processing technique determining the time of arrival of digitized electronic pulses that equals or exceeds the time resolutions achieved by traditional analog methods, while using data captured by ADCs that are an order of magnitude or more slower than the current state of the art (i.e., 250-500 MS/s, compared to 5 GSA or higher). The method is compact enough so that it can be implemented using the FPGA and/or DSP digital processing resources available in a typical modern digital spectrometer. The method works by forming one or more ratios of the values of the pulse, after removing baselines if necessary, and using them in conjunction with a reference curve or reference table to determine the pulse's arrival time offset with respect to a reference data sample. The arrival time offset is then added to the digitization time of the reference sample to produce the pulse's arrival time.

Our preferred definition of arrival time offset is the difference between the time at which the pulse crosses a threshold equal to a constant fraction of its maximum and the time of digitization of a nearby sample value. However, other definitions could be employed as well. The reference curve or table is generated by analyzing a set of similar pulses, where, for each pulse: first computing the same ratio or ratios; second, finding its arrival time offset by an accurate secondary analysis means; and, third, histogramming the resultant point. After all the pulses in the set have been histogrammed, an analytic function is fit to the data to obtain the reference curve. If a reference table is desired, its values are then generated from the reference curve. In practice, we found that using only a single ratio commonly produces superior results.

We described three secondary analysis means: first, digitizing one or more pulses with a much higher speed oscilloscope and linearly interpolating between the appropriate points to find the pulse arrival time offset as a function of the selected ratio or ratios; second, fitting one or more pulses with an analytic function and then inverting it to find the pulse arrival time offset as a function of the selected ratio or ratios; and, third, using an interpolation method on pulses collected with the same equipment to find the pulse arrival time offset as a function of the selected ratio or ratios.

In the two implementations, the first used the ratio of the two highest sample values captured and arbitrarily took the earlier of the two as the reference sample. The second implementation used the ratio of the values of a pair of samples from the pulse's leading edge, chosen to bracket some fraction of the pulse height, again choosing the earlier as the reference point. The former method worked very well with pulses of very brief duration having only a few samples over the entire pulse. The latter method works well for pulses have a fast rising edge and a broad peak or much slower falling edge. We also noted that in some circumstances it may be advantageous to perform mathematical operations on the captured signal points to obtain the values used in forming the ratios. Such mathematical operations could include interpolation, to obtain pulse values lying between the captured values, or averaging, to reduce signal noise.

We also presented a third and fourth implementations that used the two different ratios (peak or leading edge) to provide estimates of another characteristic of the pulse, its maximum value M. In both case we demonstrated that we could obtain amplitude resolutions matching state of the art values obtained using much higher digitization rates.

As we made clear in the presentation, while these embodiments are functional and effective, they were primarily presented for purposes of illustration and description. Because the taught principle is a general one, the presentation was not intended to be exhaustive or to limit the invention to the precise forms described, and obviously, many modifications and variations are possible in light of the above teaching. Thus, these embodiments were chosen and described in order to best explain the principles of the invention and its practical application to thereby enable others in the art to best utilize the invention in various embodiments and with such modifications as best suit the invention to the particular uses contemplated.

Other forms, modifications, alternative constructions and equivalents can be used and those skilled in the art will appreciate that the method can clearly be applied to measurements in other areas than nuclear physics wherein high-speed event start information is desired. As a first example, time of flight is an important technique in mass spectroscopy and the goals for arrival time precision are similar. Likewise, in LIDAR, the arrival times of light pulses are used to measure distances to reflecting objects.

As a second example, while the method is intended for on-line implementation using the relatively limited computational resources available in a digital spectrometer, the same method could be carried out off-line by a general purpose computer by first capturing detected traces to a storage device and then running an off-line processing program, exactly as we did to produce the presented figures.

Third, while we demonstrated the method using pulses provided by photomultiplier tubes detecting light, many other sensors also produce pulses whose time of arrival is of importance. Typical examples include microchannel plates, avalanche photodiodes and silicon photomultipliers.

Fourth, while we used a constant fraction definition of time of pulse arrival, other definitions are familiar to those skilled in the art, including extrapolating the leading edge to zero, and these could equally well be used.

Fifth, while our described embodiments found values for time of arrival and amplitude, we have discussed other pulse characteristics, including risetime and pulse width, that could be similarly estimated.

Finally, we note that the concept of "fast" may mean different things in different fields. A novel feature of the ratio-reference technique is that it allows time resolutions to be obtained at a level of 2-3% of the ADC sampling interval and this will work as well at 50 KS/s as at 500 MS/s and thus could be useful in very low power applications with low sampling rates.

Therefore, the above description should not be taken as limiting the scope of the invention, as defined by the appended claims.

What is claimed is:

1. A method for estimating the value of a desired characteristic of a photon or particle using a detector assembly,
    wherein the detector assembly comprises a detector that is operatively connected to an analog-to-digital convertor (ADC) and a digital computing device, the method comprising the steps of:
    operating the detector whereby a photon or particle striking the detector generates a signal pulse;
    operating the ADC to digitize the signal pulse; then
    operating the computing device to estimate the value of the characteristic of the digitized signal pulse using the following protocol:
    if the pulse has a baseline, subtracting the baseline;
    obtaining amplitude values of the pulse from regions where the amplitude changes as a function of time;
    computing one or more ratios of the obtained values; and
    using the ratio or ratios as variables in a reference calibration table or equation to generate the estimated value of the characteristic;
    wherein the reference table or equation is created beforehand by analyzing pulses of the type being measured, to establish a calibration relationship between the desired characteristic and the ratio value or values, and to codify said relationship in the table or equation.

2. The method of claim 1 wherein one or more of the amplitude values of the digitized signal pulse are obtained by interpolation or by averaging.

3. The method of claim 1, wherein the characteristic is the pulse's arrival time or maximum amplitude.

4. The method of claim 3 wherein the pulse's arrival time is defined as the time at which the original pulse would cross the value $f \cdot M$, where f is a constant and M is the original pulse's maximum amplitude.

5. The method of claim 1, wherein one of the computed ratios is $R=B/A$, wherein A and B are amplitude values of a pair of samples of the digitized signal pulse separated by N digitization intervals.

6. The method of claim 1, wherein one of the computed ratios is $R=B/A$, wherein A and B are amplitude values for the two samples that bracket the value $f \cdot M$, where f is a constant, and M is the digitized signal pulse's maximum amplitude.

7. The method of claim 1, wherein one of the computed ratios is $R=B/A$, wherein A and B are the two largest sample values of the amplitude of the pulse.

8. The method of claim 1, performed by a spectrometer.

9. The method of claim 1, wherein the detector is a photomultiplier tube (PMT), a SiPM, a Si diode, an avalanche photodiode, or a microchannel plate.

10. The method of claim 1, wherein the detector assembly is constitutes or is part of a spectrometer, a positive emission tomography (PET) scanner, a light detection and ranging (LIDAR) sensor, or a neutron energy detector.

11. The method of claim 1, wherein the ADC is operated at a speed that matches the clock speed of the digital computing device such that the device can process the digitized signal pulse from the ADC directly.

12. A method for estimating the value of a desired characteristic of a photon or particle using a detector assembly,
    wherein the detector assembly comprises a detector that is operatively connected to an analog-to-digital convertor (ADC) and a digital computing device, the method comprising the steps of:
    operating the detector whereby a photon or particle striking the detector generates a signal pulse;
    operating the ADC to digitize the signal pulse; then
    operating the computing device to estimate the value of the characteristic of the digitized signal pulse using the following protocol:
    obtaining amplitude values of the pulse above baseline from regions where the amplitude changes as a function of time;
    computing one or more ratios of the obtained values; and
    using the ratio or ratios as variables in a reference calibration table or equation to generate the estimated value of the characteristic;
    wherein the characteristic is the pulse's arrival time; and
    wherein a ratio B/A of amplitude values A and B for a pair of samples of the pulse is used to compute the pulse arrival offset $\varphi$ from the reference equation or table, $\varphi$ being defined as the time between the arrival time and the digitization time of a reference sample.

13. The method of claim 12 wherein the reference equation for $\varphi$ in terms of the ratio B/A is found by the steps of:
    first, for each pulse in a set of calibration pulses:
    a) obtaining the time values A and B for the pair of samples of the digitized signal pulse and computing the ratio B/A;
    b) computing $\varphi$ relative to a selected reference time value; and
    c) plotting the computed value of $\varphi$ as a function of B/A as a point on a scatter plot; and
    second, fitting an analytic function to the points in the scatter plot to generate the reference equation.

14. The method of claim 13, further comprising using the reference equation, so generated, to generate the reference calibration table.

15. The method of claim 13, wherein the reference calibration table or equation was created beforehand by studying a set of calibration pulses of the same type as the digitized signal pulse to be analyzed according to the method, thereby establishing a calibration relationship between the desired characteristic and the ratio or ratios so as to codify said relationship as the table or equation.

16. A method for estimating the value of a desired characteristic of a photon or particle using a detector assembly,
wherein the detector assembly comprises a detector that is operatively connected to an analog-to-digital convertor (ADC) and a digital computing device, the method comprising the steps of:
operating the detector whereby a photon or particle striking the detector generates a signal pulse;
operating the ADC to digitize the signal pulse; then
operating the computing device to estimate the value of the characteristic of the digitized signal pulse using the following protocol:
obtaining amplitude values of the pulse above baseline from regions where the amplitude changes as a function of time;
computing one or more ratios of the obtained values; and
using the ratio or ratios as variables in a reference calibration table or equation to generate the estimated value of the characteristic;
wherein the characteristic is M, the maximum value of the pulse; and
wherein a ratio B/A of amplitude values A and B for a pair of samples of the pulse is used to compute the pulse amplitude correction factor dM in relation to the amplitude of the pulse at a selected reference point from the reference calibration table or equation.

17. The method of claim 16 wherein the amplitude of the pulse at the selected reference point is one of A or B, and M is found by the equation $$M = \left(\frac{P}{1-dM}\right),$$

where P is the amplitude of the pulse at the selected reference point.

18. The method of claim 16 wherein the reference calibration table or equation for dM in terms of the ratio B/A is found by the steps of:
first, for each pulse in a set of calibration pulses:
a) obtaining the amplitude values A and B for the pair of samples of the calibration pulse and computing the ratio B/A;
b) computing dM relative to the amplitude P of the selected reference point according to the equation:

$$dM = \left(\frac{M-P}{M}\right) = \left(1 - \frac{P}{M}\right),$$

where M is the pulse maximum found using a chosen analytical method, and
c) plotting the computed value of M as a function of B/A as a point on a scatter plot; and
second, fitting an analytic function to the points in the scatter plot to generate the reference equation.

19. The method of claim 18, further comprising using the reference equation, so generated, to generate the reference calibration table.

20. A method for estimating the value of a desired characteristic of a photon or particle using a detector assembly,
wherein the detector assembly comprises a detector that is operatively connected to an analog-to-digital convertor (ADC) and a digital computing device, the method comprising the steps of:
operating the detector whereby a photon or particle striking the detector generates a signal pulse;
operating the ADC to digitize the signal pulse; then
operating the computing device to estimate the value of the characteristic of the digitized signal pulse using the following protocol:
obtaining amplitude values of the pulse above baseline from regions where the amplitude changes as a function of time;
computing one or more ratios of the obtained values; and
using the ratio or ratios as variables in a reference calibration table or equation to generate the estimated value of the characteristic;
wherein the reference equation is determined as follows:
for each pulse in a set of digitized calibration pulses:
obtaining amplitude and time values of the calibration pulse above baseline where the amplitude changes as a function of time;
creating the one or more ratios of the obtained values;
computing an estimate E of the characteristic relative to a reference value; and
plotting the computed value of E as a function of the one or more ratios as a point in a scatter plot; and then, after all the calibration pulses in the set have been so processed,
fitting an analytic equation to the points in the scatter plot to obtain the reference equation.

21. The method of claim 20, further comprising using the reference equation, so generated, to generate the reference calibration table.

22. The method of claim 20 wherein the computing of E comprises digitizing each calibration pulse using an oscilloscope or other device at a sampling rate that is higher than that of the digitized signal pulse to be analyzed, and obtaining the estimate E from the calibration pulse so digitized.

23. The method of claim 20 wherein the computing of E comprises fitting each calibration pulse with an analytic function and then mathematically extracting the value E from the function.

24. The method of claim 20 wherein the calibration pulses have been digitized at the same sampling rate as the digitized signal pulse to be analyzed, and E is computed for each of the calibration pulses by interpolating the amplitude and/or the arrival time of the pulse relative to the reference value.

25. Apparatus for estimating the value of a desired characteristic of a photon or particle, the apparatus comprising:
a detector that generates a signal pulse when struck by the photon or particle;
an analog-to-digital convertor (ADC) that digitizes the signal pulse when received from the detector; and
a digital computing device, which upon receiving a digitized pulse from the ADC, performs the following protocol:
obtaining amplitude values of the pulse above baseline from regions where the amplitude changes as a function of time;
computing one or more ratios of the obtained values; and
using the ratio or ratios as variables in a reference calibration table or equation to generate the estimated value of the characteristic;
wherein the reference table or equation is created beforehand by analyzing pulses of the type being measured, to establish a calibration relationship between the desired characteristic and the ratio value or values, and to codify said relationship in the table or equation.

26. The apparatus of claim 25 wherein the characteristic is the pulse's arrival time, defined as the time at which the original pulse would cross the value f·M, where f is a constant and M is the pulse's maximum value.

27. The apparatus of claim 25, which constitutes or is part of a spectrometer,
wherein the spectrometer is operatively connected to an external computer system, network or display device such that the estimated value of the characteristic of particles or photons striking the detector can be reported or displayed.

28. The apparatus of claim 25, which constitutes or is part of a spectrometer, a positive emission tomography (PET) scanner, a light detection and ranging (LIDAR) sensor, or a neutron energy detector.

29. Apparatus for estimating the value of a desired characteristic of a photon or particle, the apparatus comprising:
detector means for generating a digital signal pulse when struck by the photon or particle;
means for obtaining amplitude above baseline and time offset values of the digital pulse where amplitude changes as a function of time;
means for computing one or more ratios of the obtained amplitude or time values;
means for sourcing a reference table or equation, wherein the reference table or equation provides a calibration relationship between the desired characteristic and such ratio or ratios; and
means for using the ratio or ratios as variables in the reference calibration table or equation to generate the estimate of the characteristic of the digitized signal pulse;
wherein the apparatus is programmed to perform the following steps:
for each pulse in a set of calibration pulses:
obtaining amplitude and time offset values of the pulse above the baseline where the amplitude changes significantly as a function of time;
creating the one or more ratios of the obtained values;
computing estimate E of the desired characteristic relative to the reference; and
plotting the estimate E in a scatter plot of values E versus the one or more ratios; and then, after all the pulses in the set have been so processed,
fitting an analytic equation to the points in the scatter plot to obtain the reference equation.

30. Apparatus for estimating the value of a desired characteristic of a photon or particle, the apparatus comprising:
detector means for generating a digital signal pulse when struck by the photon or particle;
analog-to-digital converting means for converting said signal pulse to a digital pulse;
means for obtaining amplitude above baseline and time offset values of the digital pulse where amplitude changes as a function of time;
means for computing one or more ratios of the obtained amplitude or time values;
means for sourcing a reference table or equation, wherein the reference table or equation provides a calibration relationship between the desired characteristic and such ratio or ratios; and
means for using the ratio or ratios as variables in the reference calibration table or equation to generate an estimate of the desired characteristic,
wherein the desired characteristic is M, the maximum value of the pulse.

* * * * *